(12) United States Patent
Kim et al.

(10) Patent No.: US 12,367,565 B2
(45) Date of Patent: Jul. 22, 2025

(54) EFFICIENT INVERSE TONE MAPPING NETWORK FOR STANDARD DYNAMIC RANGE (SDR) TO HIGH DYNAMIC RANGE (HDR) CONVERSION ON HDR DISPLAY

(71) Applicant: SAMSUNG ELECTRONICS CO., LTD., Suwon-si (KR)

(72) Inventors: Joonsoo Kim, Irvine, CA (US); Chenguang Liu, Tustin, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 364 days.

(21) Appl. No.: 17/820,187

(22) Filed: Aug. 16, 2022

(65) Prior Publication Data

US 2023/0059233 A1    Feb. 23, 2023

Related U.S. Application Data

(60) Provisional application No. 63/234,416, filed on Aug. 18, 2021.

(51) Int. Cl.
  *G06T 5/92*    (2024.01)
  *G06T 5/94*    (2024.01)

(52) U.S. Cl.
  CPC .............. *G06T 5/92* (2024.01); *G06T 5/94* (2024.01); *G06T 2207/20016* (2013.01); *G06T 2207/20084* (2013.01); *G06T 2207/20208* (2013.01)

(58) Field of Classification Search
  CPC ... G06T 5/92; G06T 5/94; G06T 2207/20016; G06T 2207/20084; G06T 2207/20208;
  (Continued)

(56) References Cited

U.S. PATENT DOCUMENTS

| 7,336,707 B2 | 2/2008 | Kim |
| 8,659,617 B2 | 2/2014 | Cho et al. |

(Continued)

FOREIGN PATENT DOCUMENTS

| CN | 102625028 | 9/2016 | |
| CN | 110599418 A * | 12/2019 | ............. G06T 5/009 |

(Continued)

OTHER PUBLICATIONS

D. Marnerides et al. "ExpandNet: A Deep Convolutional Neural Network for High Dynamic Range Expansion from Low Dynamic Range Content", May 22, 2018, Computer Graphics Forum vol. 37 (Year: 2018).*

(Continued)

*Primary Examiner* — John Villecco
*Assistant Examiner* — Alejandro Hernandez
(74) *Attorney, Agent, or Firm* — Sherman IP LLP; Kenneth L. Sherman; Steven Laut

(57) ABSTRACT

A computer-implemented method includes providing a machine learning network including a global inverse tone mapping (GITM) structure and a local inverse tone mapping (LITM) structure that utilize one or more non-linear basis functions with one or more coefficient functions. The one or more non-linear basis functions learn linearly to facilitate combination with at least one convolution layer for jointly learning the machine learning network. A weighted mask (WM) is provided for reducing one or more visual artifacts, including one or more quantization artifacts in a smooth texture type of region of an output of the machine learning network.

20 Claims, 56 Drawing Sheets
(55 of 56 Drawing Sheet(s) Filed in Color)

(58) Field of Classification Search
CPC .......... G06T 5/90; G06T 3/4076; G06T 5/70; G06T 5/009; G06T 5/007; G06T 3/4053; G06T 3/40; H04N 1/60; G06N 3/045; G06N 3/08; G06N 3/0464; G06N 3/084; G06N 3/02

See application file for complete search history.

(56) References Cited

U.S. PATENT DOCUMENTS

| | | | |
|---|---|---|---|
| 8,731,246 | B2 | 5/2014 | Yamamoto et al. |
| 8,743,291 | B2* | 6/2014 | Li ............................ H04N 9/67 |
| | | | 345/603 |
| 8,872,836 | B2 | 10/2014 | Rabii |
| 8,982,963 | B2 | 3/2015 | Gish et al. |
| 9,418,591 | B2 | 8/2016 | Kim et al. |
| 9,691,353 | B2 | 6/2017 | Joo et al. |
| 9,911,179 | B2* | 3/2018 | Su ............................ H04N 19/86 |
| 10,018,826 | B2 | 7/2018 | Nakatsuka |
| 10,354,575 | B2 | 7/2019 | Yang et al. |
| 10,402,952 | B2 | 9/2019 | Baar et al. |
| 10,657,631 | B2* | 5/2020 | Yip ............................ G06T 5/40 |
| 10,706,774 | B2 | 7/2020 | Lee |
| 10,741,119 | B2 | 8/2020 | Zeng et al. |
| 10,885,384 | B2 | 1/2021 | Michael et al. |
| 10,984,758 | B1* | 4/2021 | Croxford ............... G09G 5/391 |
| 11,006,151 | B2 | 5/2021 | Olivier et al. |
| 11,127,372 | B2 | 9/2021 | Kim et al. |
| 11,176,646 | B2 | 11/2021 | Tao et al. |
| 11,217,164 | B2 | 1/2022 | Kim et al. |
| 11,301,967 | B2 | 4/2022 | Peri et al. |
| 11,574,408 | B2 | 2/2023 | Bao et al. |
| 11,600,072 | B2 | 3/2023 | Russo et al. |
| 2007/0236410 | A1 | 10/2007 | Shimizu |
| 2008/0111886 | A1 | 5/2008 | Bai |
| 2011/0090959 | A1* | 4/2011 | Wiegand ................ H04N 19/82 |
| | | | 375/240.12 |
| 2011/0194618 | A1* | 8/2011 | Gish ........................ G06T 5/50 |
| | | | 375/E7.027 |
| 2016/0200254 | A1 | 7/2016 | Raab |
| 2017/0061592 | A1* | 3/2017 | Reinhard ................... G06T 5/77 |
| 2018/0005352 | A1* | 1/2018 | Silverstein ............... G06T 1/20 |
| 2018/0315154 | A1* | 11/2018 | Park .................... G06F 18/2413 |
| 2018/0350047 | A1* | 12/2018 | Baar ........................ G06T 5/92 |
| 2019/0082138 | A1 | 3/2019 | Pan et al. |
| 2019/0236761 | A1* | 8/2019 | Cauvin ................ H04N 1/4072 |
| 2019/0238895 | A1 | 8/2019 | Thoreau et al. |
| 2019/0349607 | A1* | 11/2019 | Kadu .................... H04N 19/177 |
| 2020/0020303 | A1 | 1/2020 | Kim et al. |
| 2020/0090301 | A1 | 3/2020 | Kim et al. |
| 2020/0320672 | A1* | 10/2020 | Guermoud ............... G06T 5/50 |
| 2020/0394772 | A1 | 12/2020 | Afra |
| 2021/0150812 | A1 | 5/2021 | Su et al. |
| 2021/0166360 | A1* | 6/2021 | Kim ........................ G06T 5/60 |
| 2022/0020319 | A1 | 1/2022 | Lee |
| 2022/0028355 | A1 | 1/2022 | Chun et al. |
| 2022/0076018 | A1* | 3/2022 | Geiss ..................... G06V 10/56 |
| 2022/0351342 | A1* | 11/2022 | Rassool .................... G06T 5/92 |
| 2023/0047673 | A1 | 2/2023 | Kim et al. |
| 2023/0050664 | A1 | 2/2023 | Jnawali et al. |
| 2023/0059233 | A1* | 2/2023 | Kim ........................ G06T 5/60 |
| 2023/0127327 | A1* | 4/2023 | Abdelhamed ............ G06T 5/60 |
| | | | 382/164 |
| 2023/0281766 | A1* | 9/2023 | Kumar ..................... G06T 5/70 |
| 2023/0351562 | A1* | 11/2023 | Zhao ........................ G06T 5/60 |
| 2023/0360595 | A1 | 11/2023 | Jnawali et al. |
| 2024/0221134 | A1* | 7/2024 | Zhao ........................ G06T 5/40 |
| 2024/0257324 | A1* | 8/2024 | Le ............................ G06T 5/92 |
| 2025/0037227 | A1* | 1/2025 | Modrzyk ............... G06F 9/4881 |

FOREIGN PATENT DOCUMENTS

| | | | | |
|---|---|---|---|---|
| CN | 111050224 | | 4/2020 | |
| CN | 117354435 | A * | 1/2024 | ............ G06T 5/008 |
| EP | 1772849 | B1 | 8/2012 | |
| KR | 10-2017-0037783 | A | 4/2017 | |
| KR | 10-2017-0049241 | A | 5/2017 | |
| KR | 10-2019-0019438 | A | 2/2019 | |
| KR | 10-2019-0053036 | A | 5/2019 | |
| KR | 10-2020-0078293 | A | 7/2020 | |
| KR | 10-2279373 | B1 | 7/2021 | |
| KR | 10-2337829 | B1 | 12/2021 | |
| KR | 10-2348028 | B1 | 1/2022 | |
| WO | WO-2018076038 | A1 * | 5/2018 | ............ G06T 15/20 |

OTHER PUBLICATIONS

Dae-Eun Kim and Munchurl Kim, "Learning-Based Low-Complexity Reverse Tone Mapping With Linear Mapping", Feb. 2, 2020, IEEE Transactions On Circuits and Systems for Video Technology vol. 30 (Year: 2020).*

Yuma Kinoshita et al. "Convolutional Neural Networks Considering Local and Global features for image Enhancement", Aug. 26, 2029, IEEE (Year: 2019).*

Luxi Zhao et al. "Learning Tone Curves for Local Image Enhancement", May 30, 2022, IEEE (Year: 2022).*

U.S. Non-Final Office Action for U.S. Appl. No. 17/818,679 mailed Feb. 13, 2024.

U.S. Non-Final Office Action for U.S. Appl. No. 17/818,679 mailed May 9, 2023.

U.S. Non-Final Office Action for U.S. Appl. No. 17/818,681 mailed Sep. 24, 2024.

U.S. Corrected Notice of Allowability for U.S. Appl. No. 18/143,266 mailed Apr. 3, 2024.

U.S. Advisory Action for U.S. Appl. No. 17/818,679 mailed Jan. 17, 2024.

Society of Motion Picture and Television Engineers, "D-Cinema Quality—Reference Projector and Environment", Apr. 6, 2011, RP 431-2:2011, New York {Abstract Only}.

International Telecommunications Union, "Parameter Values for Ultra-High Definition Television Systems for Production and International Programme Exchange", ITU-R rec. BT.2020-1,"Parameter Values for Ultra-High Definition Television Systems for Production and International Programme Exchange", Jun. 2014, pp. 1-8, Geneva, CH.

Kovaleski, R. et al., "High-quality reverse tone mapping for a wide range of exposures," SIBGRAPI, Aug. 26, 2014, pp. 49-56, United States.

Masia, B. et al., "Dynamic range expansion based on image statistics," Multimedia Tools and Applications, Jan. 2017, pp. 631-648, vol. 76, No. 1, United States.

Huo, Y. et al., "Physiological inverse tone mapping based on retina response," The Visual Computer, May 2014, pp. 507-517, vol. 30, No. 5, Springer {Abstract Only}.

Yang, X. et al. "Image correction via deep reciprocating HDR transformation," in Proceedings of the IEEE Conference on Computer Vision and Pattern Recognition (CVPR), Jun. 2018, pp. 1798-1807, IEEE, United States.

Kim, S. et al., "Learning the inverse tone mapping from low dynamic range video to high dynamic range displays using convolutional neural networks," Proceedings of the Asian Conference on Computer Vision (ACCV), Dec. 2, 2018, pp. 395-409, Springer, {Abstract Only}.

Kim, S. et al., "Deep SR-ITM: Joint learning of super-resolution and inverse tone-mapping for 4K UHD HDR applications," Proceedings of IEEE International Conference on Computer Vision (ICCV), 2019, pp. 3116-3125, IEEE, United States {Abstract Only}.

Wang, C. et al., "Deep inverse tone mapping for compressed images," IEEE Access, Jun. 5, 2019, pp. 74558-74569, vol. 7, IEEE, United States.

Eilertsen, G. et al., "HDR image reconstruction from a single exposure using deep Cnns," ACM Transactions on Graphics, Nov. 2017, pp. 1-15, vol. 36, No. 6, United States.

Santos, M. et al., "Single image HDR reconstruction using a CNN with masked features and perceptual loss," ACM Transactions on Graphics, Jul. 2020, ppl. 1-10, vol. 39, No. 4, United States.

(56) References Cited

OTHER PUBLICATIONS

Ronneberger, O., et al., "U-net: Convolutional networks for biomedical image segmentation," in MICCAI, Oct. 5, 2015, pp. 234-241, Springer International Publishing Switzerland.
International Telecommunications Union, "Reference Electro-Optical Transfer Function for Flat Panel Displays used in HDTV Studio Production", Mar. 2011, pp. 1-7, Recommendation ITU-R BT.1886, Geneva, CH.
Glorot, X. et al., "Deep sparse rectifier neural networks," Proceedings of the Fourteenth International Conference on Artificial Intelligence and Statistics, 2011, pp. 315-323, v. 15, United States.
Clevert, D-A, et al., "Fast and accurate deep network learning by exponential linear units (ELUs)," ParXiv preprint arXiv:1511.07289, Nov. 23, 2015, pp. 1-14, United States.
Dang-Nguyen, DT., et al., "Raise: A raw images dataset for digital image forensics," in Proceedings of the 6th ACM Multimedia Systems Conference, 2015, MMSys '15, p. 219-224, Association for Computing Machinery, New York, NY, United States, {Abstract Only}.
Wang, Z. et al., "Image quality assessment: from error visibility to structural similarity," IEEE Transactions on Image Processing, Apr. 2004, pp. 600-612, vol. 13, No. 4, IEEE, United States.
Banterle, F. et al., "Advanced High Dynamic Range Imaging", (2nd Edition), Jul. 2017, AK Peters (CRC Press), Natick, MA, USA.
U.S. Notice of Allowance for U.S. Appl. No. 17/818,679 mailed Jul. 29, 2024.
U.S. Final Office Action for U.S. Appl. No. 17/818,679 mailed Oct. 3, 2023.
U.S. Notice of Allowance for U.S. Appl. No. 18/143,266 mailed Mar. 27, 2024.
Cozar, J.R., et al. "Logotype detection to support semantic-based video annotation." Signal Processing: Image Communication, Aug. 2007, pp. 669-679, vol. 22, Issues 7-8, Elsevier B.V., Netherlands.
Oh, E., et al. "49-2: Hierarchical Logo Detection and Image Processing Algorithm for Preventing OLED Image Sticking." SID Symposium Digest of Technical Papers, May 30, 2018, pp. 643-646, vol. 49. No. 1, Wiley Press Room, United States.
Shin, Y.G., et al., "A novel burn-in potential region detection method using image processing technique", IEEE International Conference on Consumer Electronics (ICCE), Jan. 8, 2017, pp. 215-216, IEEE, United States.
International Search Report and Written Opinion dated Nov. 14, 2022 for International Application PCT/KR2022/012147, from Korean Intellectual Property Office, pp. 1-11, Republic of Korea.
Mantiuk, R. et al., "HDR-VDP-2: A calibrated visual metric for visibility and quality predictions in all luminance conditions", ACM Transactions on Graphics, Jul. 2011, pp. 40:1-40:13, vol. 30, No. 4, ACM.
Ahn, W. et al., "Flat-region detection and false contour removal in the digital TV display." 2005 IEEE International Conference on Multimedia and Expo, 2005, pp. 1-4, IEEE, United States.
Oh, E., et al. "Hierarchical Logo Detection and Image Processing Algorithm for Preventing OLED Image Sticking." SID Symposium Digest of Technical Papers, 2018, p. 643-646, vol. 49. No. 1, United States.
Shin, H-K, et al. "A luminance control method for OLED burn-in prevention using user information." 2022 IEEE International Conference on Consumer Electronics, 2022, pp. 1-2, IEEE, United States.
U.S. Non-Final Office Action for U.S. Appl. No. 18/143,266 mailed Jan. 3, 2024.
International Search Report and Written Opinion dated Nov. 18, 2022 for International Application PCT/KR2022/012361, from Korean Intellectual Property Office, pp. 1-10, Republic of Korea.
U.S. Corrected Notice of Allowability for U.S. Appl. No. 18/143,266 mailed May 17, 2024.
U.S. Notice of Allowance for U.S. Appl. No. 17/818,681 mailed Nov. 20, 2024.
U.S. Corrected Notice of Allowability for U.S. Appl. No. 17/818,681 mailed Jan. 16, 2025.
Extended European Search Report dated Sep. 4, 2024 for EP Patent Application No. 22856304.5, from European Patent Office, pp. 1-8, Germany.
U.S. Corrected Notice of Allowability for U.S. Appl. No. 17/818,679 mailed Dec. 20, 2024.
U.S. Corrected Notice of Allowability for U.S. Appl. No. 17/818,679 mailed Oct. 17, 2024.
U.S. Corrected Notice of Allowability for U.S. Appl. No. 17/818,681 mailed Jan. 29, 2025 by Examiner David S. Perlman.

\* cited by examiner (1)

(2)

(3)

(4)

(2)

213 SingleHDR (3)

(4)

(5)

(2)

(3)

Masia (4)

(5)

Hdrcnn (6)

SingleHDR (7)

ITM-CNN (9)

(10)

(11)

SR-ITM (12)

(13)

(2)

(3)

Masia (4)

Huo (5)

Hdrcnn (6)

Img Correction (8)

Efficient-ITM1

(10)

(11)

Efficient-ITM-SR1

(13)

(2)

Kovaleski (3)

Masia (4)

Huo (5)

SingleHDR (7)

(8)

Efficient-ITM1

(10)

Efficient-ITM-SR1

(13)

Efficient-ITM-SR2

(14)

EFFICIENT INVERSE TONE MAPPING NETWORK FOR STANDARD DYNAMIC RANGE (SDR) TO HIGH DYNAMIC RANGE (HDR) CONVERSION ON HDR DISPLAY

CROSS-REFERENCE TO RELATED APPLICATIONS

This application claims the priority benefit of U.S. Provisional Patent Application Ser. No. 63/234,416, filed Aug. 18, 2021, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to conversion from standard dynamic range (SDR) to high dynamic range (HDR), and in particular, to an efficient neural network (NN) for inverse tone mapping (ITM) for SDR to HDR conversion on HDR displays.

BACKGROUND

High dynamic range (HDR) television (TV) has been improved to be able to display upward of 2000 nits of peak brightness for HDR contents with much wider color gamut than digital cinema initiative protocol 3 (DCI-P3), etc. Original HDR video contents, however, are still not enough to satisfy the demand, and therefore, standard dynamic range (SDR) videos still dominate the market. For solving this issue, SDR to HDR conversion methods have been proposed to the industry. The demand of HDR video contents has increased since HDR TV improved its capability to display high peak brightness and wide color gamut for HDR contents. Some deep neural network (DNN) based SDR to HDR conversion methods outperforms other methods, but they are either too large to implement on devices or they have quantization artifacts generated on smooth regions on images.

SUMMARY

One embodiment provides a computer-implemented method that includes providing a machine learning network including a global inverse tone mapping (GITM) structure and a local inverse tone mapping (LITM) structure that utilize one or more non-linear basis functions with one or more coefficient functions. The one or more non-linear basis functions learn linearly to facilitate combination with at least one convolution layer for jointly learning the machine learning network. A weighted mask (WM) is provided for reducing one or more visual artifacts, including one or more quantization artifacts in a smooth region of an output of the machine learning network.

Another embodiment includes a non-transitory processor-readable medium that includes a program that when executed by a processor performs SDR content to HDR content conversion, including providing, by the processor, a machine learning network including a GITM structure and a LITM structure that utilize one or more non-linear basis functions with one or more coefficient functions. The processor further learns the one or more non-linear basis functions linearly to facilitate combination with at least one convolution layer for jointly learning the machine learning network. The processor additionally provides a WM for reducing one or more visual artifacts, including one or more quantization artifacts in a smooth region of an output of the machine learning networks.

Still another embodiment provides an apparatus that includes a memory storing instructions, and at least one processor executes the instructions including a process configured to provide a machine learning network including a GITM structure and a LITM structure that utilize one or more non-linear basis functions with one or more coefficient functions. The process is further configured to learn the one or more non-linear basis functions linearly to facilitate combination with at least one convolution layer for jointly learning the machine learning network. The process is additionally configured to provide a WM for reducing one or more visual artifacts, including one or more quantization artifacts in a smooth region of an output of the machine learning network.

These and other features, aspects and advantages of the one or more embodiments will become understood with reference to the following description, appended claims and accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and advantages of the embodiments, as well as a preferred mode of use, reference should be made to the following detailed description read in conjunction with the accompanying drawings, in which.

DETAILED DESCRIPTION

Figure 1:
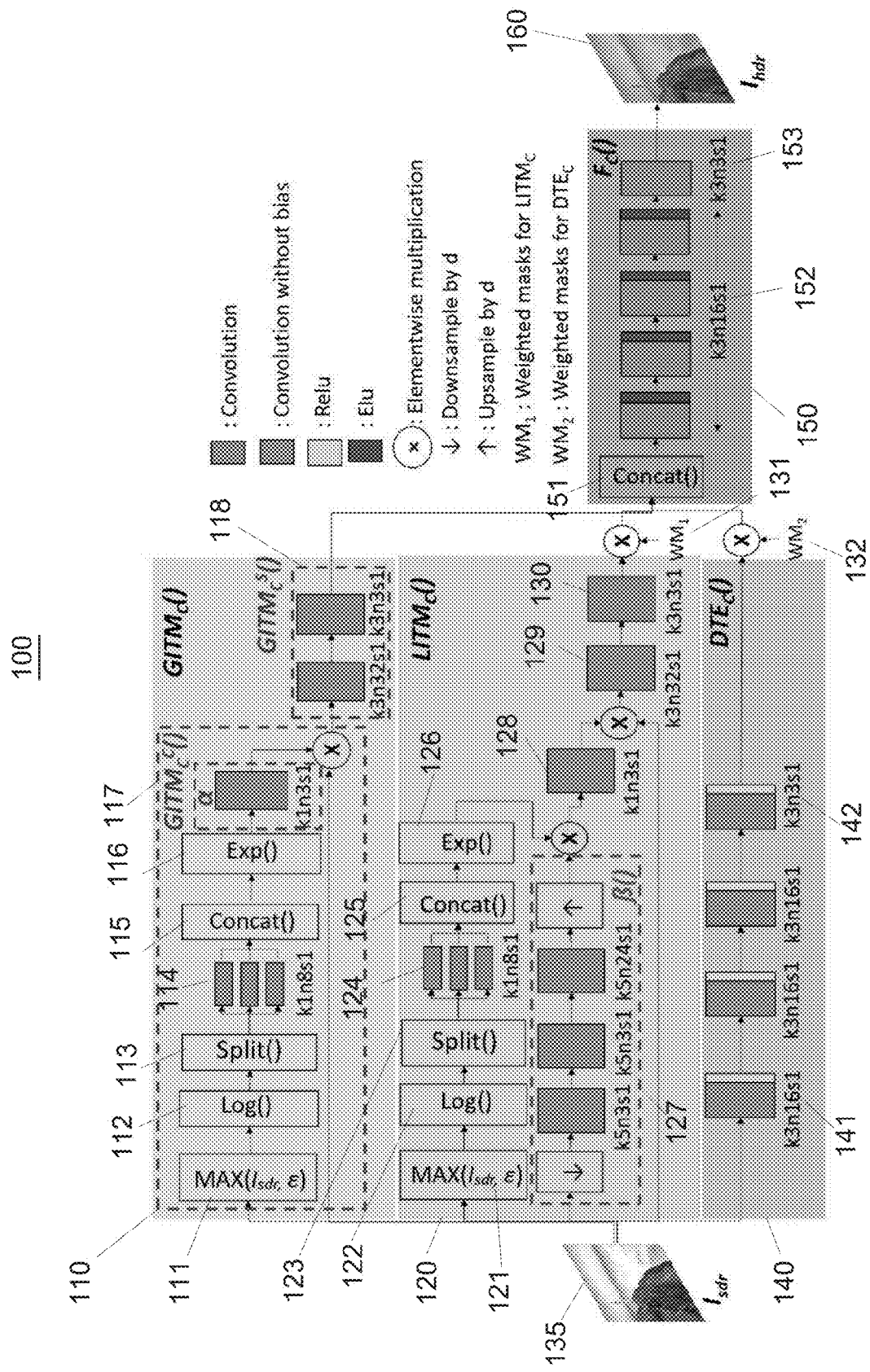
FIG. 1 illustrates an example pipeline diagram associated with the disclosed technology for efficient neural network (NN) for inverse tone mapping (ITM) for standard dynamic range (SDR) to high dynamic range (HDR) conversion on HDR displays, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

One or more embodiments relate generally to conversion from standard dynamic range (SDR) to high dynamic range (HDR), and in particular, to an efficient neural network (NN) for inverse tone mapping (ITM) for SDR to HDR conversion on HDR displays. One embodiment provides a computer-implemented method that includes providing a machine learning network including a global inverse tone mapping (GITM) structure and a local inverse tone mapping (LITM) structure that utilize one or more non-linear basis functions with one or more coefficient functions. The one or more non-linear basis functions learn linearly to facilitate combination with at least one convolution layer for jointly learning the machine learning network. A weighted mask (WM) is provided for reducing one or more visual artifacts, including one or more quantization artifacts in a smooth region of an output of the machine learning network.

For SDR to HDR conversion in the non-linear code domain, the main purpose of this conversion is to make a gamma encoded SDR image in BT.709 color gamut directly mapped to a perceptual quantizer (PQ) encoded HDR image in BT.2020 color gamut. Therefore, a deep neural network (DNN) model should learn the complicated non-linear relationship that includes not only the inverse tone mapping between SDR to HDR (luminance) but also color gamut expansion (BT.709 to BT.2020) and optical to electronic transfer function (OETF). To convert SDR to HDR with good quality, the large sized DNN is necessary. However, a large sized DNN is a critical problem to overcome due to implementation of the network in the display device, such as TV and an augmented reality/virtual reality (AR/VR) device. Also, these networks often generate quantization artifacts on smooth regions, which is a very critical problem in the industry.

In some embodiments, an efficient inverse tone mapping (ITM) neural network, including two efficient structures Global ITM (GITM) and Local ITM (LITM). GITM and LITM are designed using a small series of a basis function with its coefficient function, which is followed by few convolutional layers. The GITM and LITM jointly learn global and local features, which represent complicated non-linear inverse tone and contrast mapping between SDR and HDR images. These structures can be combined with any convolution layers so that the entire efficient ITM can be jointly trained for learning inverse tone, enhanced details and expanded color gamut from SDR to HDR. Due to the implementation of GITM and LITM, the NN may be kept small with good performance.

In some embodiments, the SDR to HDR conversion system is modeled using a new DNN structure that learns non-linear ITM between SDR and HDR more efficiently than some other techniques. In the design of the new DNN, the focus is on both $I_{sdr}$ to $I_{hdr}$ inverse tone mapping and a color gamut expansion. In one or more embodiments, the model for SDR to HDR conversion is defined as follows:

$$I_{hdr} = C(ITM(I_{sdr})) = ITM_c(I_{sdr})$$

where C( ) is a color gamut expansion function, ITM( ) is an inverse tone mapping function and $ITM_c$( ) is an inverse tone mapping function with a color gamut expansion. The ITM is split into a GITM, a LITM and a detail enhancement (DTE) as follows:

$$ITM_c(I_{sdr}) = F(GITM_c(I_{sdr}); LITM_c(I_{sdr}); DTE(I_{sdr}))$$

where $GITM_c$( ) is a global inverse tone mapping function with a color gamut expansion, $LITM_c$( ) is a local inverse tone mapping function with a color gamut expansion, DTE( ) is a detail enhancement function that restores the suppressed details in SDR content, and F( ) is a function that combines and optimizes the outputs of $GITM_c$( ), $LITM_c$( ) and DTE( ).

FIG. 1 illustrates an example pipeline diagram associated with the disclosed technology for efficient neural network (NN) for ITM for SDR (e.g., input image 135 ($I_{sdr}$) to HDR (e.g., output image 160 ($I_{hdr}$)) conversion on HDR displays, according to some embodiments. Recent DNN methods train convolutional NNs (CNNs) using a set of paired SDR and HDR images to learn the relationship between them. Distinguishable from some CNN methods, in some embodiments of the disclosed technology, the GITM 110 and LITM 120 utilize a series of non-linear basis functions (power functions) with coefficient functions, both of which are learnable, and fewer convolution layers to model very complicated mapping between SDR and HDR. Generally, the non-linearity of the power functions is not learnable in CNNs. However, in one or more embodiments the design of GITM 110 and LITM 120 makes them learn linearly, which helps them to be combined with any convolution layers to jointly learn the entire network.

In some embodiments, both GITM 110 and LITM 120 structures are learnable and have fewer (i.e., a limited number of) convolution layers to model mappings between SDR and HDR. GITM 110 and LITM 120 can also enable the power functions to be learnable in a linear way, which helps them to be combined with any convolution layers for jointly learning the entire network. In both GITM 110 and LITM 120, there is a sequence of functions such as logo (112/122)—Split( ) (113/123)—1×1 convolution (114/124) without bias—concatenation (concato) (115/125)—Expo (116/126)—1×1 convolution( ) ($GITM_c^c$( ) 117/k1n3s1 128). This makes the non-linear basis function with coefficients learnable in a linear way. Generally, the nonlinearity of the power functions is not learnable in CNNs. However, in some embodiments the design of the GITM 110 and LITM 120 structure make the power functions learnable in a linear way, which helps them to be combined with any convolution layers for jointly learning the entire network. $GITM_c^c$( ) 117 is a channel-wise global inverse tone mapping function with color expansion between SDR and HDR images, and $GITM_c^s(\ )$ 118 is a spatial function that combines the outputs $GITM_c^c(\ )$ 117 to restore HDR tone more correctly. The Max function 111/121 returns the maximum between $I_{sdr}$ and ε. Block 127 includes a downsample function (by integer d), convolution filters (k5n3s1×2 and k5n24s1 and an upsample function (by integer d). LITM 120 additionally includes convolution filters k3n321 129 and k3n3s1 130.

One or more embodiments provide a weighted mask (WM) 131/132 for reducing one or more visual artifacts, including one or more quantization artifacts in a smooth region. The disclosed technology can enable, based on utilizing the WM 131/132, a local enhancement subnetwork (e.g., LITM 120) to contribute less quantization error to a final output 160 (i.e., to reduce amplification of the quantization artifacts in the smooth region). Some DNN methods often generate quantization artifacts in the smooth region because the convolutional layers, which are trained to enhance low frequency texture from SDR to HDR, also amplify the quantization errors in the smooth region. Using WM 131/132, some embodiments force a local enhancement subnetwork, such as LITM 120, to contribute less quantization errors to the final output.

In one or more embodiments, the role of GITM 110 is very crucial as GITM 110 mainly restores the global image tones, which is a very important image quality metric for HDR images. By restoring the global tone using the GITM 110, LITM 120 and DTE 140 can correctly learn the local mapping such as local tone and detail restoration for HDR images. Learning the accurate global inverse tone between SDR and HDR using CNNs causes a huge network because the CNNs use many convolutional layers to learn the complicated non-linear inverse tone. However, in some embodiments, the light weighted GITM 110 structure can learn the complicated non-linear inverse tone more efficiently and effectively. Distinguishable from some CNN methods, the GITM 110 utilizes a series of non-linear basis functions (power functions) with coefficient (a), both of which are learnable, and fewer convolution layers are needed to model the very complicated mapping between SDR and HDR. Generally, the nonlinearity of the power functions is not learnable in CNNs. The GITM 110, however, can make the power functions learnable in a linear way, which helps them to be combined with any convolution layers for jointly learning the entire network. DTE 140 includes convolution filters k3n16s1 141 and convolution filter k3n3s1 142.

In some embodiments, the main purpose of LITM 120 is to restore local tones. Similar to GITM 110, the non-linear basis function of LITM 120 is also learned. However, the coefficient function (ß( )) of the basis function is learned in LITM 120 while the coefficient (value) of basis function is learned. Since the basis function is modeled as multiple convolution layers as shown, the neighbor pixels within a convolutional kernel are used to learn local contrast.

In one or more embodiments, in both structures (GITM 110 and LITM 120), the non-linear basis function of each GITM 110 and LITM 120 is learned. The combination of multiple basis functions can represent very complicated global and local tones while the number of learning parameters of the basis function is very small. This makes the network very light with accurate SDR to HDR conversion.

In some embodiments, the SDR to HDR conversion system is modeled using a new DNN structure that can learn non-linear inverse tone mapping between SDR and HDR more efficiently. The model for SDR to HDR conversion is defined as follows:

$GITM_c(\ )$: a global inverse tone mapping function with a color gamut expansion, $LITM_c(\ )$: a local inverse tone mapping function with a color gamut expansion, $DTE_c(\ )$: a detail enhancement function that restores the suppressed details in SDR content $F_c(\ )$ 150: a function that combines and optimizes the outputs of $GITM_c(\ )$, $LITM_c(\ )$ and $DTE_c(\ )$.

$F_c)$ 150 includes concatenation function concat ( ) 151, convolution filters k3n16s1 152 and convolution filter k3n3s1 153.

In one or more embodiments, since the color expansion is performed through the entire network, some of the color expansion can be performed through $DTE_c(\ )$ and $F_c(\ )$. $GITM_c(\ )$ and $LITM_c(\ )$ are modeled with the combination of non-linear function and simple convolutions, which can represent the complicated non-linear inverse tone more accurately with less parameters than multiple convolution layers used in many methods. For $DTE_c(\ )$ and $F_c(\ )$, some convolution layers are employed. Once the SDR image is fed into the system, the same input is processed in each of $GITM_c(\ )$, $LITM_c(\ )$ and $DTE_c(\ )$ separately. Then, the corresponding outputs are merged and optimized through $F_c(\ )$. Note that the outputs of $LITM_c(\ )$ and $DTE_c(\ )$ would be multiplied with weighted masks ($WM_1$ 131 and $WM_2$ 132) before fusion to avoid visual artifact on smooth regions.

Certain CNN based SDR to HDR conversions sometimes generate artifacts on the smooth region such as sky (see, e.g., FIG. 2). That is because the same convolution filters, which are trained to enhance local tone and textures between SDR and HDR, are used to boost the quantization artifacts in the smooth region. For the simple solution of this problem, some embodiments provide the WM ($WM_1$ 131 and $WM_2$ 132) and apply it to the outputs of LITM 120 and DTE 140 so that the local tones and details enhancement is applied to non-smooth region only. The WM ($WM_1$ 131 and $WM_2$ 132) divides an image into three regions using non-smooth texture metric defined by a gradient magnitude:

$$WM(I_{sdr}) = \begin{cases} 0 & F_{mag}^{ave} < T_{low} \\ \frac{F_{mag}^{ave} - T_{low}}{T_{high} - T_{low}} & T_{low} \le F_{mag}^{ave} < T_{high} \\ 1 & F_{mag}^{ave} \ge T_{high} \end{cases}$$

where:

$F_{mag}^{ave}$ is a moving average of gradient magnitude in 9×9 windows on gray image of $I_{sdr}$ $T_{low}$ is the lower bound of a non-smoothness metric $T_{high}$ the upper bound of a non-smoothness metric.

$WM_1$ 131 and $WM_2$ 132 are denoted as weighted masks for LITM 120 and DTE 140 respectively. In one or more embodiments, $WM(I_{sdr})$ for both $WM_1(I_{sdr})$ and $WM_2(I_{sdr})$. Then, an element-wise multiplication is performed between $WM_1(I_{sdr})$ and $LITM_c(I_{sdr})$ and between $WM_2(I_{sdr})$ and $DTE(I_{sdr})$.

$$LITM_{wc}(I_{sdr}) = LITM_c(I_{sdr}) \odot (WM_1(I_{sdr}))$$

$$DTE_{wc}(I_{sdr}) = DTE(I_{sdr}) \odot (WM_2(I_{sdr}))$$

where $LITM_{wc}(I_{sdr})$ and $DTE_{wc}(I_{sdr})$ are the weight mask outputs from $LITM_c(I_{sdr})$ and $DTE(I_{sdr})$ respectively and is an element-wise multiplication. Note that the weighted mask is computed using a gray image and the same weighted mask is applied to all the channels of $LITM_c(I_{sdr})$ and $DTE(I_{sdr})$.

In one or more embodiments, the outputs of GITM 110, LITM 120 and DTE 140 (feature maps) are concatenated and are refined through multiple convolutional layers as follows. In some embodiments, all the activations used are exponential linear unit (ELU). Once $GITM_c(I_{sdr})$, $LITM_{wc}(I_{sdr})$ and $DTE_{wc}(I_{sdr})$ are obtained, the system concatenates them for fusion. Then the concatenated feature maps are fused and refined through multiple convolutional layers as follows $$F_c(f) = (c3_3 \circ c3_{16} \circ c3_{13} \circ c3_{16} \circ c1_{16})(f)$$

where:
- $c3_{16}$: a convolutional layer that has 3×3 filter size with 16 output channels;
- t: the concatenated feature maps; and
- ∘: function operator to combine two functions sequentially.

Note that an ELU activation function is used for c316 to obtain better refinement.

Some embodiments employ a loss function as follows:

$$L(\theta) = \frac{1}{N_I} \sum_{k=1}^{N_I} \|F_c(f_k; \theta) - \Delta I_k\|^2 + \frac{\lambda}{N_{\theta'}} \sum_{l \in \theta'} \|\theta_l\|^2$$

where:
- $N_I$: the number of training images.
- $f_k$: the concatenated features maps for the $k^{th}$ training image
- $\Delta I_k$: the $k^{th}$ ground truth HDR image
- $\theta'$: the set of our network parameters except bias
- $N_{\theta'}$: is the number of the parameters of $\theta'$
- $\lambda$: a constant for weighting the model parameter as a regularization term.

As some techniques combine SDR to HDR conversion with super resolution (SR) at the same time, which is denoted as SR-ITM, one or more embodiments extend the Efficient-ITM to SR-ITM to check if the network works well for this application. This network is referred to as "Efficient-ITM-SR." Since the purpose of this extension is to prove that the network can learn the non-linear relationship between SDR and HDR even in an SR-ITM application, the GITM 110 and LITM 120 remain the same as Efficient-ITM. The only modification of the fusion network is to support 2× SR. The same loss function of Efficient-ITM is used here. The fusion part, F( ) for Efficient-ITM-SR is then defined as follows:

$$F(f) = c3_3 \circ (c3_{16})^6 \circ c3_{16}^t \circ c3_{16})(f)$$

where $c3_{16}^t$ is a transpose convolution layer with 16 output channels and it increases the resolution by 2. For $(c3_{16})^6$ it means that six $c3_{16}$ layers are serially connected. Note that ELU activation function for $c3_{16}$ and $c3_{16}^t$. Compared to Efficient-ITM, the size of the fusion subnetwork is increased to enhance the details more in Efficient-ITM-SR.

In one or more embodiments, the processing hardware includes a light weight NN for SDR to HDR conversion that can be implemented in a display device, such as a TV, an AR/VR display. Even though the NN is much smaller than some networks, the embodiments can achieve more accurate SDR to HDR conversion accuracy. Therefore, users of a TV or an AR/VR display can experience an HDR effect from SDR content, which are still dominant in the content market.

Figure 2A:
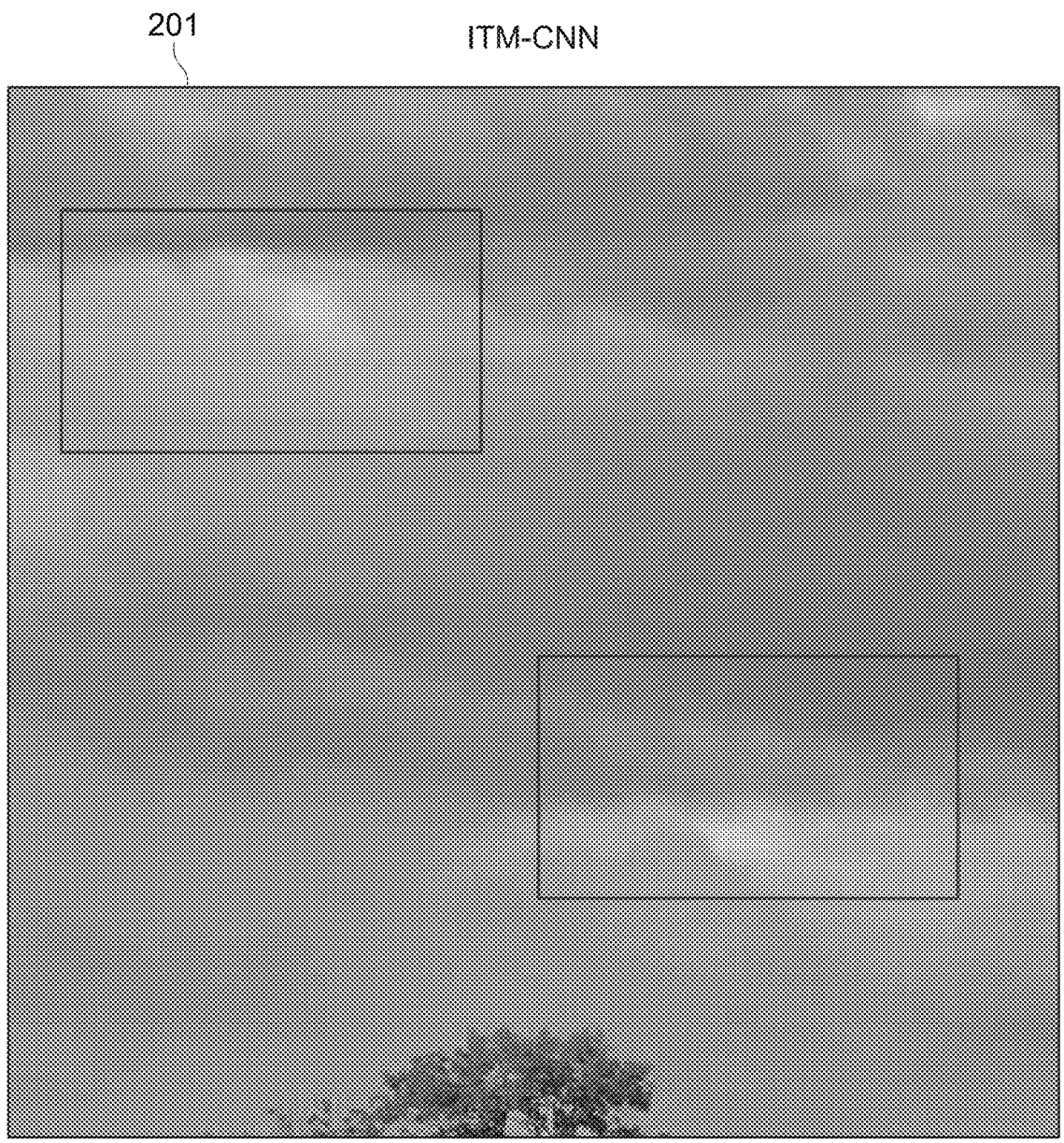
FIGS. 2A-B illustrate an example qualitative comparison of output images of an example embodiment with output images of other techniques.
Figure 2A:
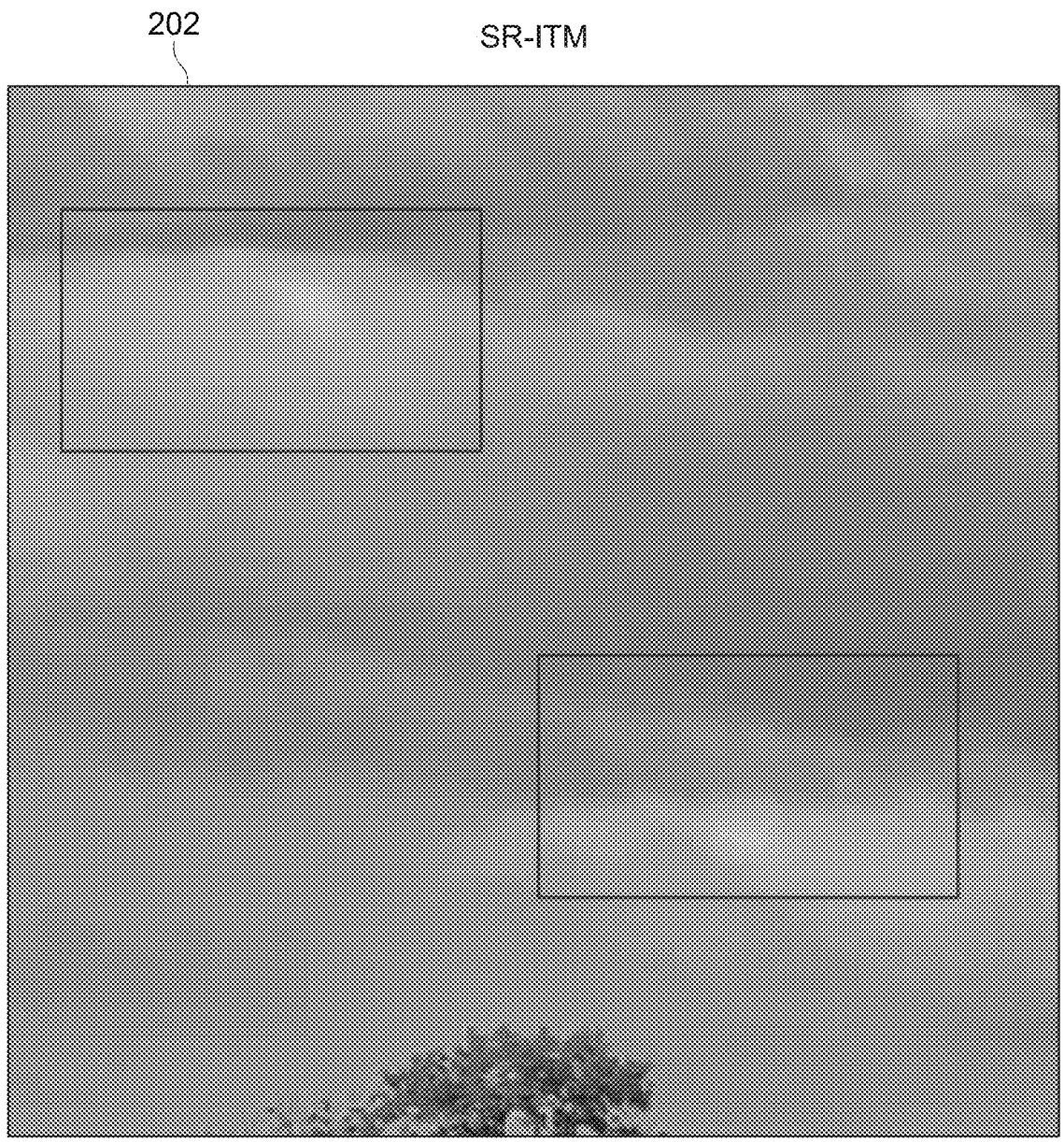
Figure 2A:
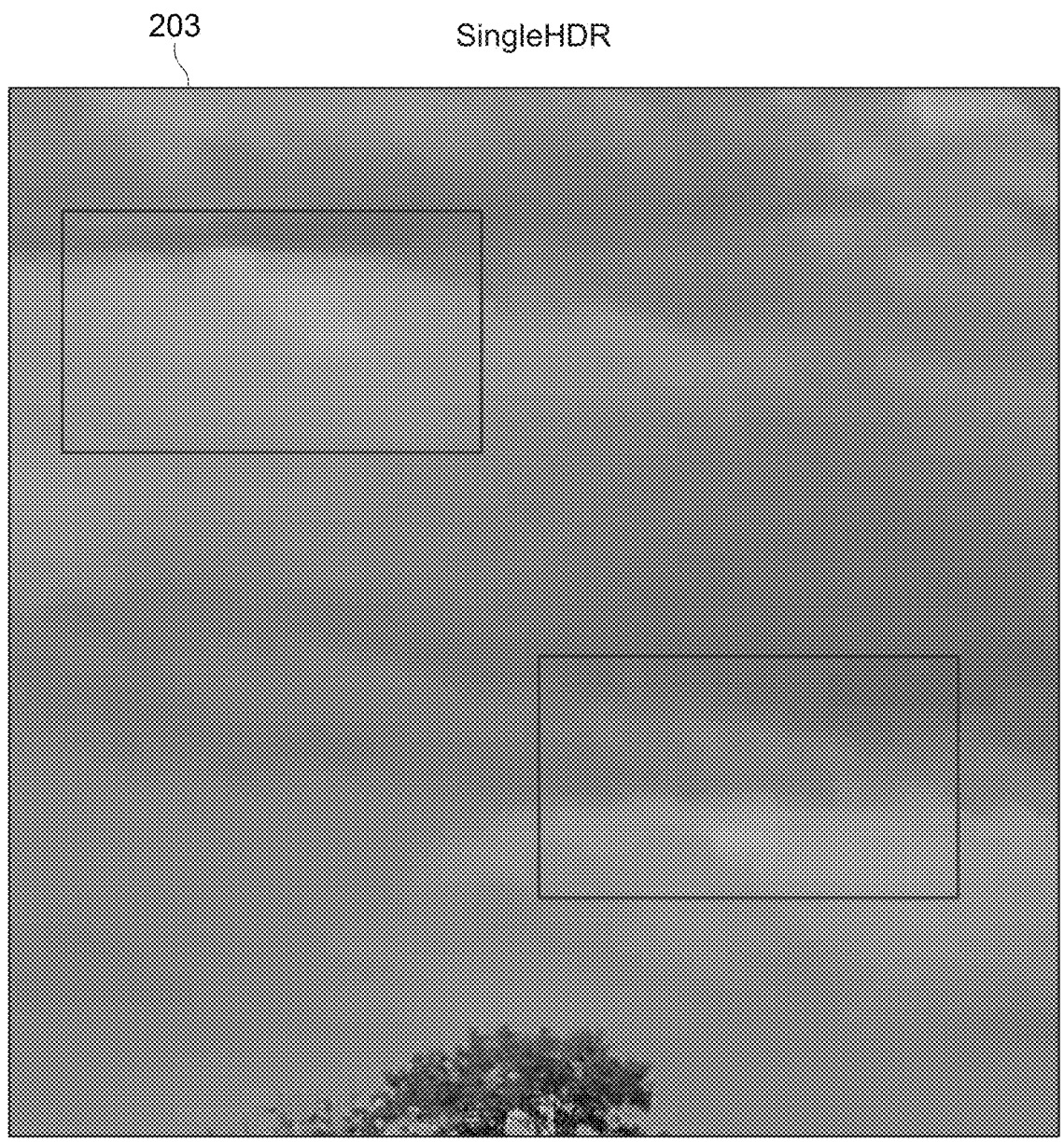
Figure 2A:
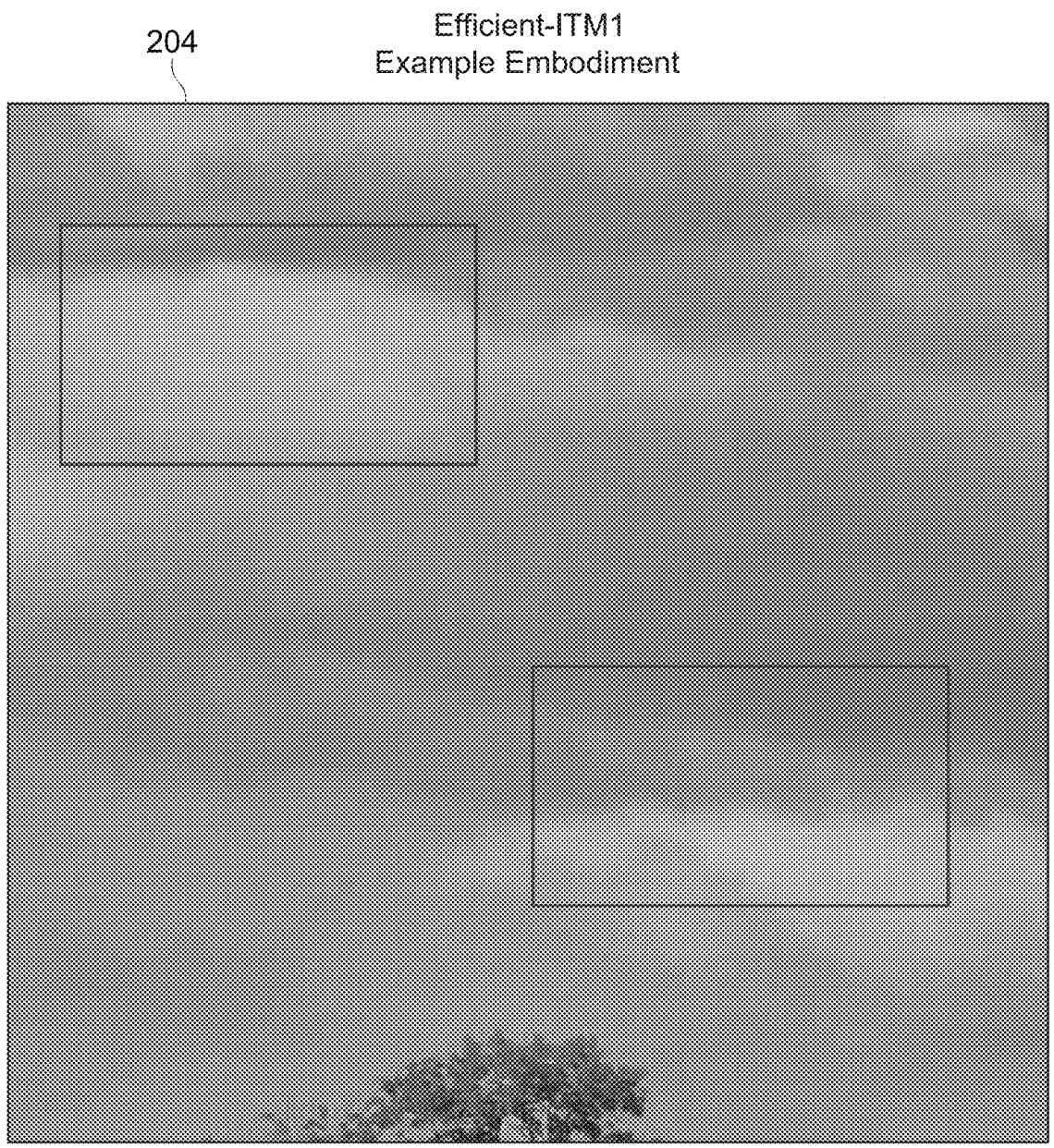
Figure 2A:
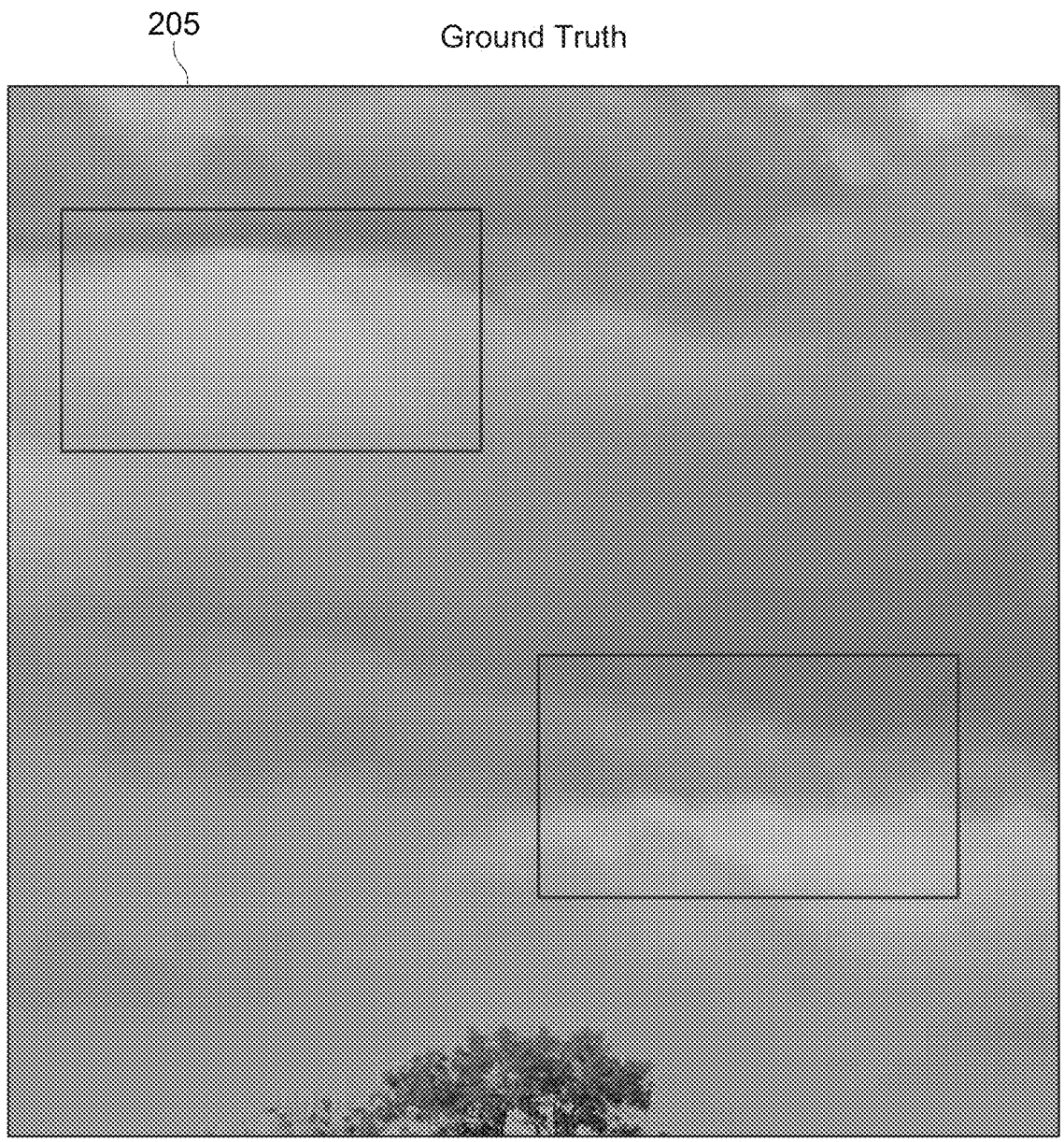
Figure 2B:
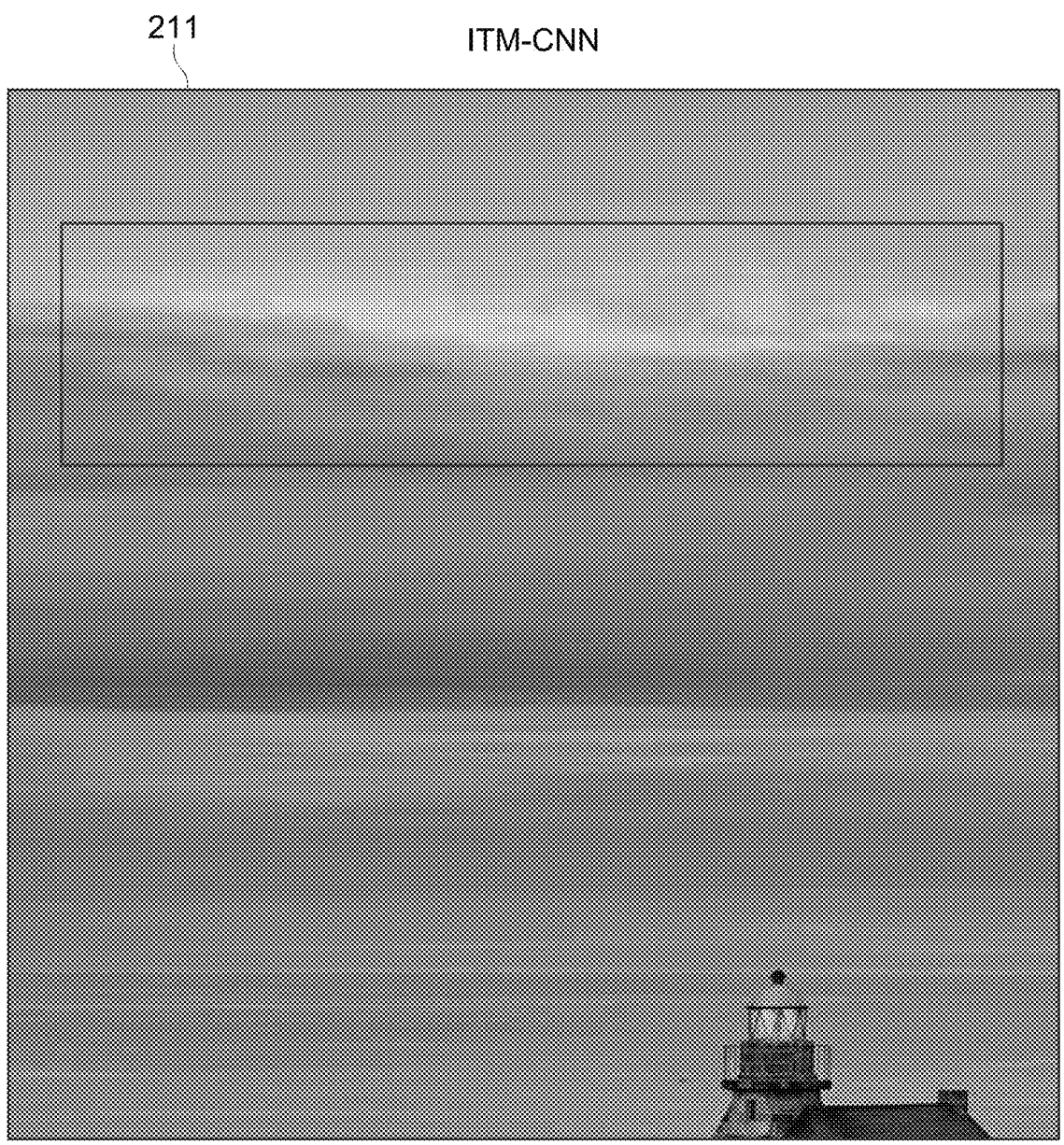
Figure 2B:
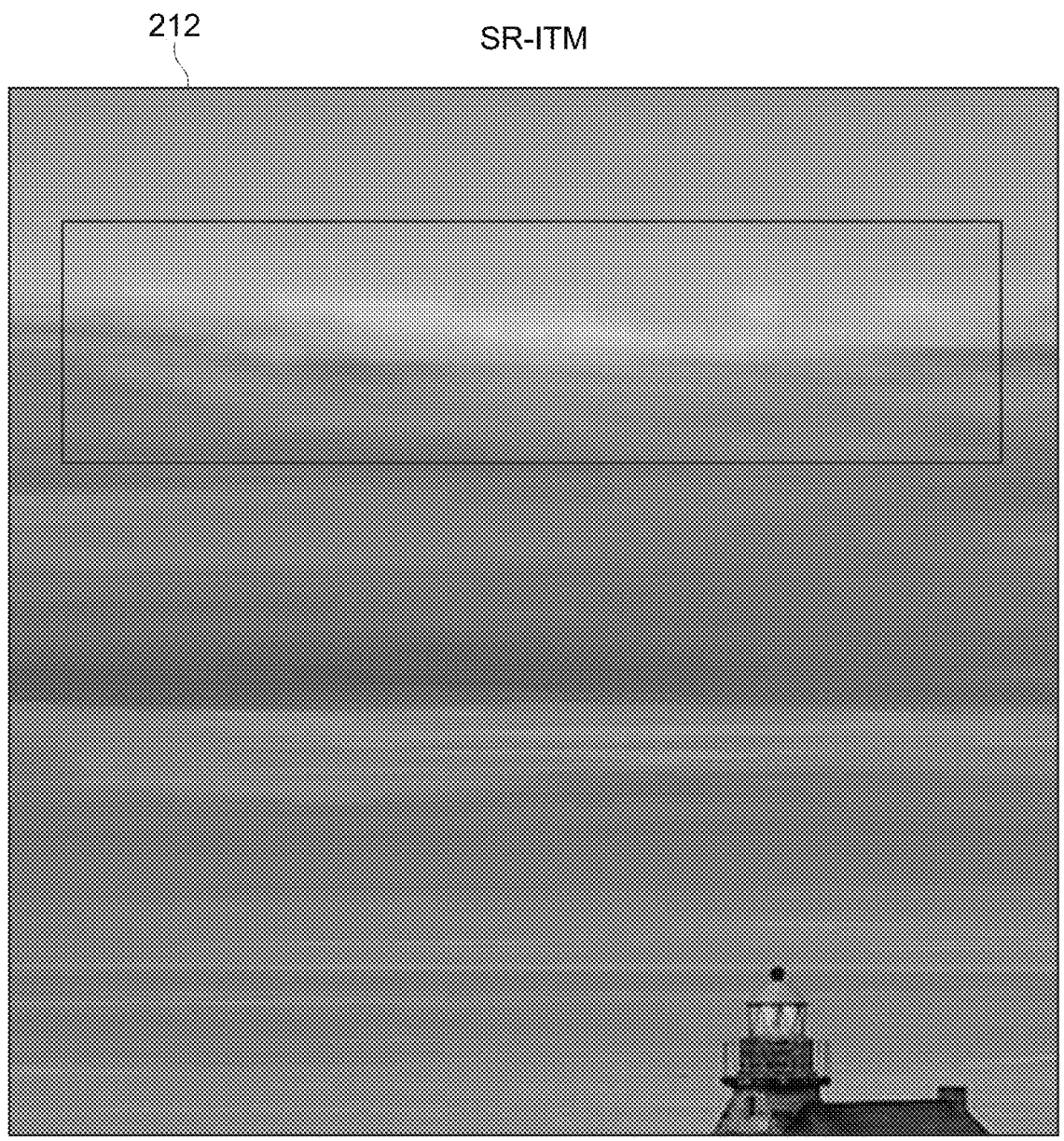
Figure 2B:
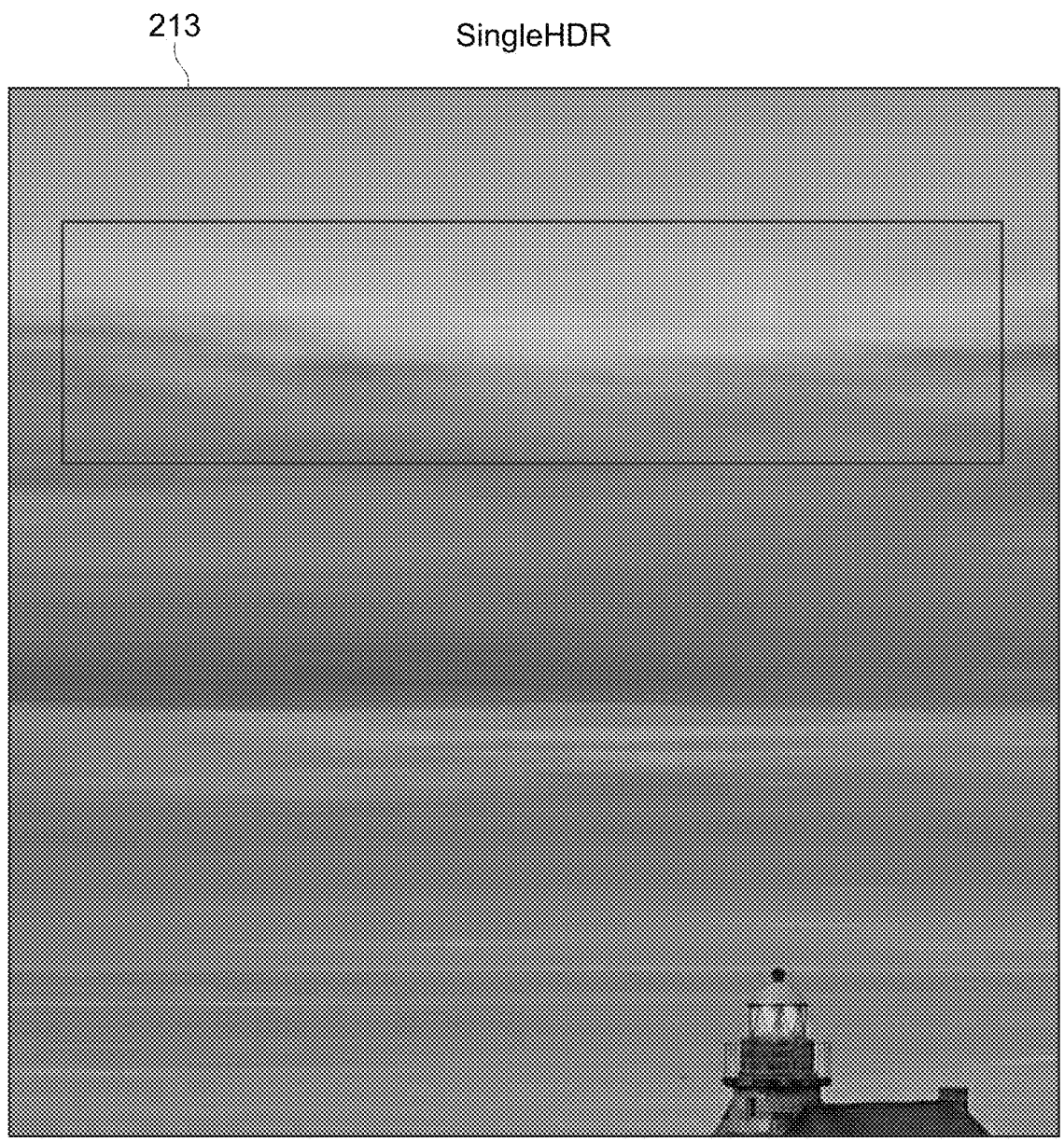
Figure 2B:
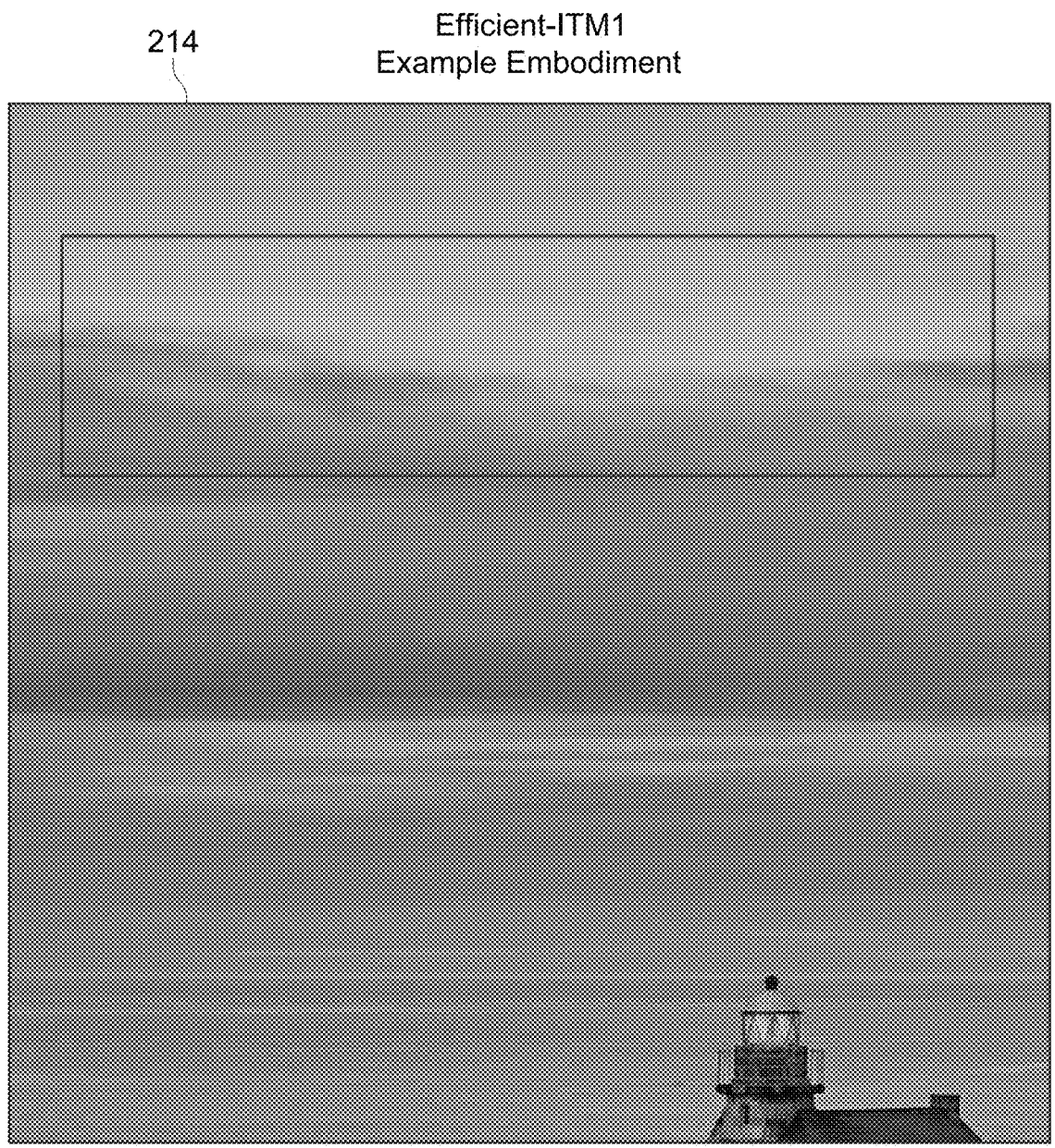
Figure 2B:
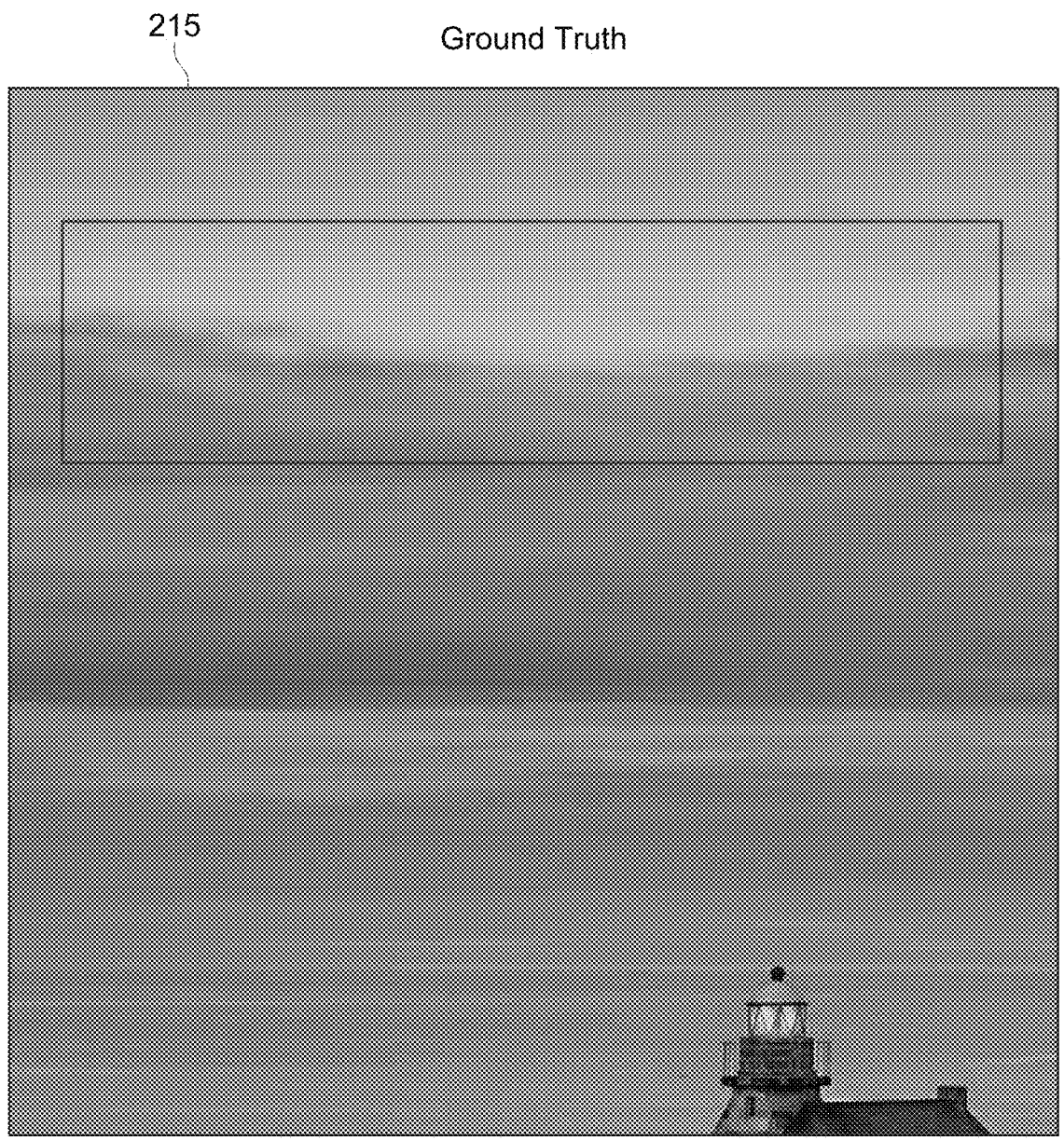

FIGS. 2A-B illustrate an example qualitative comparison of output images of an example embodiment with output images of other techniques. The comparison includes output images from ITM-CNN 201/211, SR-ITM 202/212, singleHDR 203/213, the efficient ITM1 204/214 according to some embodiments, and ground truth 205/215. The rectangular boxes show portions that have artifacts therein. As shown, one can observe that some CNN based SDR to HDR conversions (ITM-CNN 201/211, SR-ITM 202/212, singleHDR 203/213) sometimes generate artifacts on the smooth region such as sky images. That is because the same convolution filters, which are trained to enhance local tone and textures between SDR and HDR, are used to boost the quantization artifacts in the smooth region. Since the purpose of LITM 120 (FIG. 1) and DTE 140 (FIG. 1) is to enhance local tones and details, they can also boost the quantization artifacts in the smooth region. Therefore, some embodiments use the WM 131/132 (FIG. 1) and apply it to the outputs of LITM 120 and DTE 140 so that the local tones and details enhancement is applied to only non-smooth regions. Therefore, the smooth regions in SDR content are still smooth in converted HDR content while non-smooth regions are enhanced with more details in the converted HDR content. Applying LITM 120 and DTE 140 on non-smooth regions only can avoid generating quantization artifacts on the smooth region in the converted HDR while the details of textures and edges are enhanced.

Figure 3:
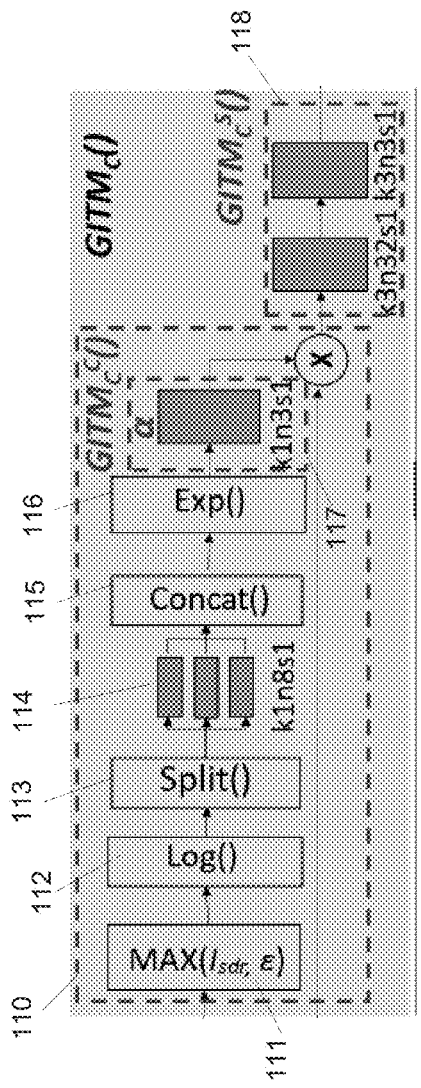
FIG. 3 illustrates an example isolated pipeline diagram associated with the disclosed technology for global inverse tone mapping (GITM), according to some embodiments.

FIG. 3 illustrates an example isolated pipeline diagram associated with the disclosed technology for GITM 110, according to some embodiments. The GITM 110 mainly restores the global image tones, which is very important image quality metric for HDR images. By restoring the global tone using the GITM 110, the LITM 120 (FIG. 1) and the DTE 140 (FIG. 1), the system can correctly learn the local mapping such as local tone and detail restoration for HDR images. In some approaches, learning the accurate global inverse tone between SDR and HDR using CNNs results in using many convolutional layers to learn the complicated non-linear inverse tone. One or more embodiments, however, use the light weighted GITM 110 structure that can learn the complicated non-linear inverse tone more efficiently and effectively.

Figure 5:
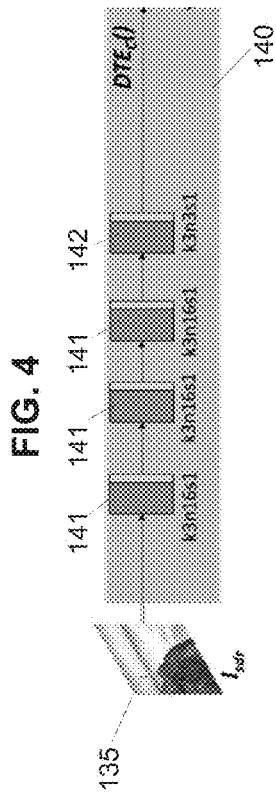
FIG. 5 illustrates an example isolated pipeline diagram associated with the disclosed technology for local detail enhancement (DTE), according to some embodiments.

For $GITM_c^s()$ 118, some embodiments model it using two (2) convolutional layers (k3n32s1 and k3n3s1). Note that sequential connection of $GITM_c^c()$ 117 and $GITM_c^s()$ 118 provide for learning the global inverse tone more accurately by considering the global inverse tone of neighbor pixels. In one or more embodiments, $GITM_c^s()$ 117 is modeled by the multiplication of a gain function and the original SDR image 135 ($I_{sdr}$) (FIG. 5).

$$GJTM_c^e(I_{sdr}^k) = G(I_{sdr}^k) \odot I_{sdr}^k \quad k \in \{R, G, B\}$$

G( ): a gain function
$I_{sdr}^k$: the k color channel of $I_{sdr}$
⊙: an element-wise multiplication.

Then the G( ) is modeled using a series of basis functions of $I_{sdr}^j$.

$$G(I_{sdr}^k) = \sum_{j \in \{R,G,B\}} \sum_{i=1}^{N} \alpha_{jik} \varphi_{jik}(I_{sdr}^j) \quad k \in \{R, G, B\}$$

$$\varphi_{jik}(I_{sdr}^j) = (I_{sdr}^j)^{r_{jik}} = \exp(r_{jik} \cdot \log(I_{sdr}^j))$$

where:
- $r_{jik}$: the learnable parameter of $\varphi_{jik}()$
- $\alpha_{jik}$: a coefficient of $\varphi_{jik}()$
- N: the number of basis functions in on color channel.

Figure 4:
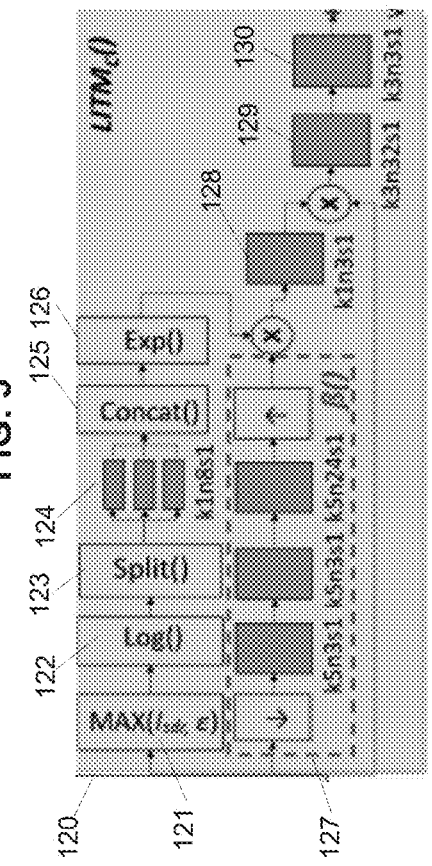
FIG. 4 illustrates an example isolated pipeline diagram associated with the disclosed technology for local inverse tone mapping (LITM), according to some embodiments.

FIG. 4 illustrates an example isolated pipeline diagram associated with the disclosed technology for LITM 120, according to some embodiments. In one or more embodiments, LITM 120 restores local contrast. Similar to GITM 110 (FIGS. 1, 3), LITM$_c$( ) using a gain function with an SDR image followed by two convolution layers:

$$LITM_c(I_{sdr}) = (c3_3 \circ c3_{32} \circ (L(I_{sdr}) \circ I_{sdr}))$$

where:
L: a gain function
$c3_n$: a convolutional layer that has 3×3 filter size with n output channels.
Then, L( ) is modeled as:

$$L(I_{sdr}) = c1_3 \circ (\beta(I_{sdr}) \odot \sum_{j \in \{R,G,B\}} \sum_{i=1}^{N} \exp(l_{ji} \cdot \log(I_{sdr}^j)))$$

where:
β( ): a coefficient function that generated 3N coefficient maps from $I_{sdr}$
$I_{ji}$: the power of the basis function.
The coefficient functions are defined as follows:

$$\beta(I_{sdr}) = (up_d \circ c5_{3N} \circ c5_3 \circ c5_3 \circ dn_d)(I_{sdr})$$

where:
$up_d$: bi-linear upsampling function by d.
$dn_d$: bi-linear downsampling function by d
$c5_n$: a convolutional layer that has 5×5 filter with n output channels FIG. 5 illustrates an example isolated pipeline diagram associated with the disclosed technology for local DTE 140, according to some embodiments. In one or more embodiments, DTE 140 enhances image details. Some embodiments include convolution layers followed by a rectified linear unit (ReLU) function activation for DTE 140. Compared to other methods, DTE 140 is much smaller because the inverse tone can be restored from GITM 110 (FIGS. 1, 3) and LITM 120 (FIGS. 1, 4). The DTE 140 is then modeled as follows:

$$DTE_c(I_{sdr}) = (c3_3 \circ c3_{16} \odot c3_{16} \circ c3_{16})(I_{sdr})$$

where:
$c3_n$ is a convolutional layer that has 3×3 filter size with n output channels. Note that ReLU is used here for non-linear activation.

Figure 6A:
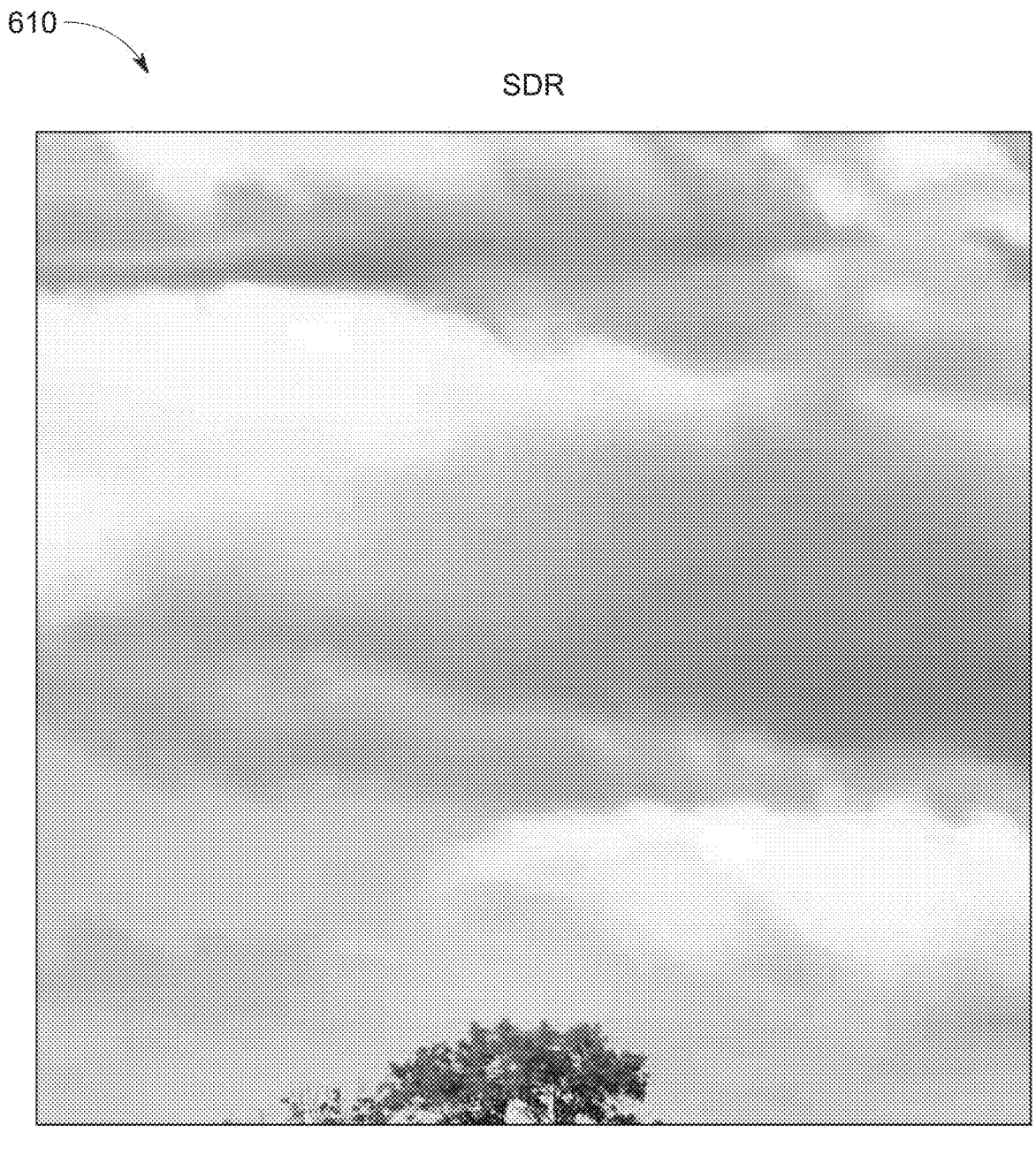
FIGS. 6A-C illustrate example qualitative comparisons of output images of some embodiments with output images of other techniques.
Figure 6A:
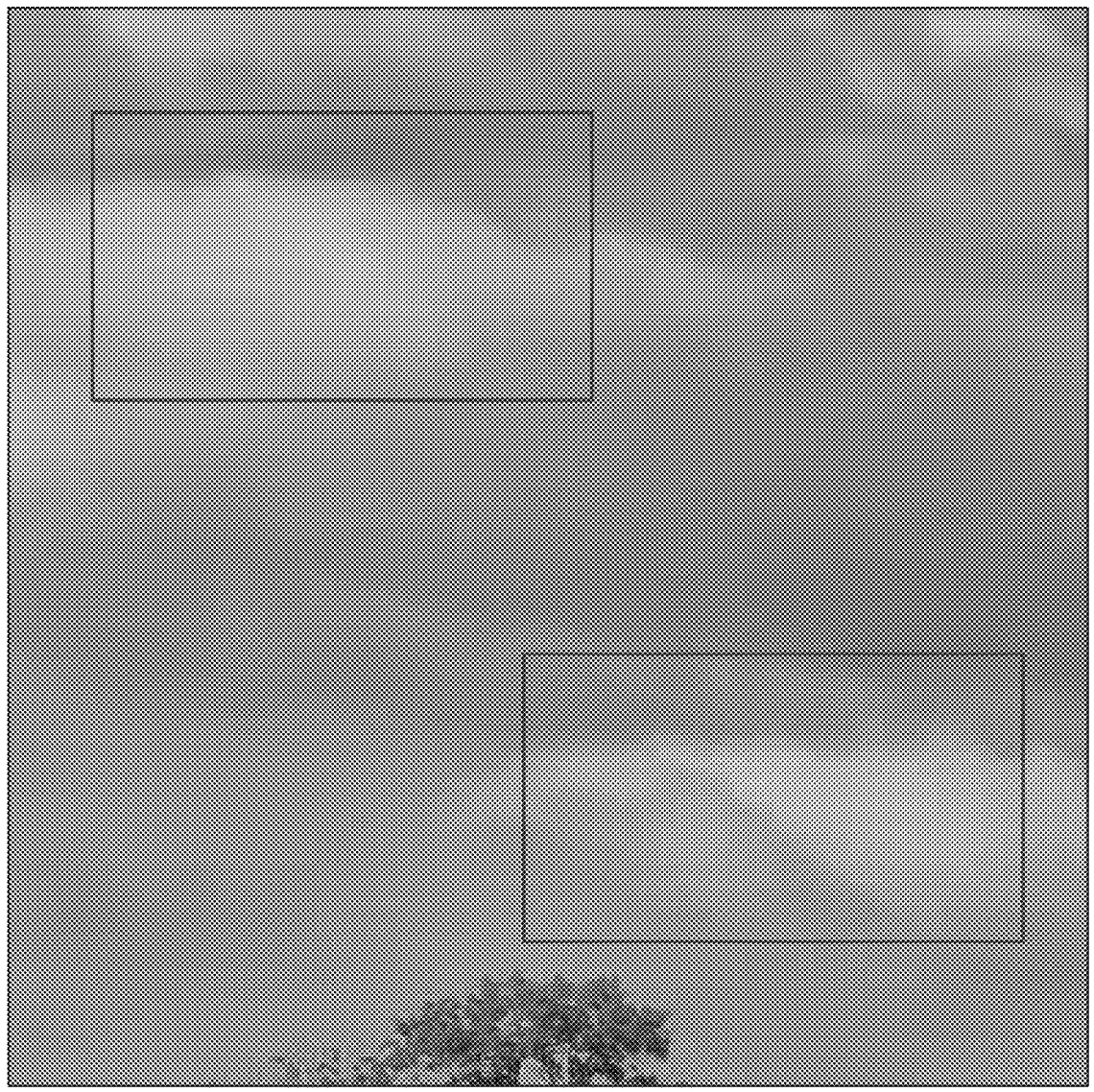
Figure 6A:
Figure 6A:
Figure 6A:
Figure 6A:
Figure 6A:
Figure 6A:
Figure 6A:
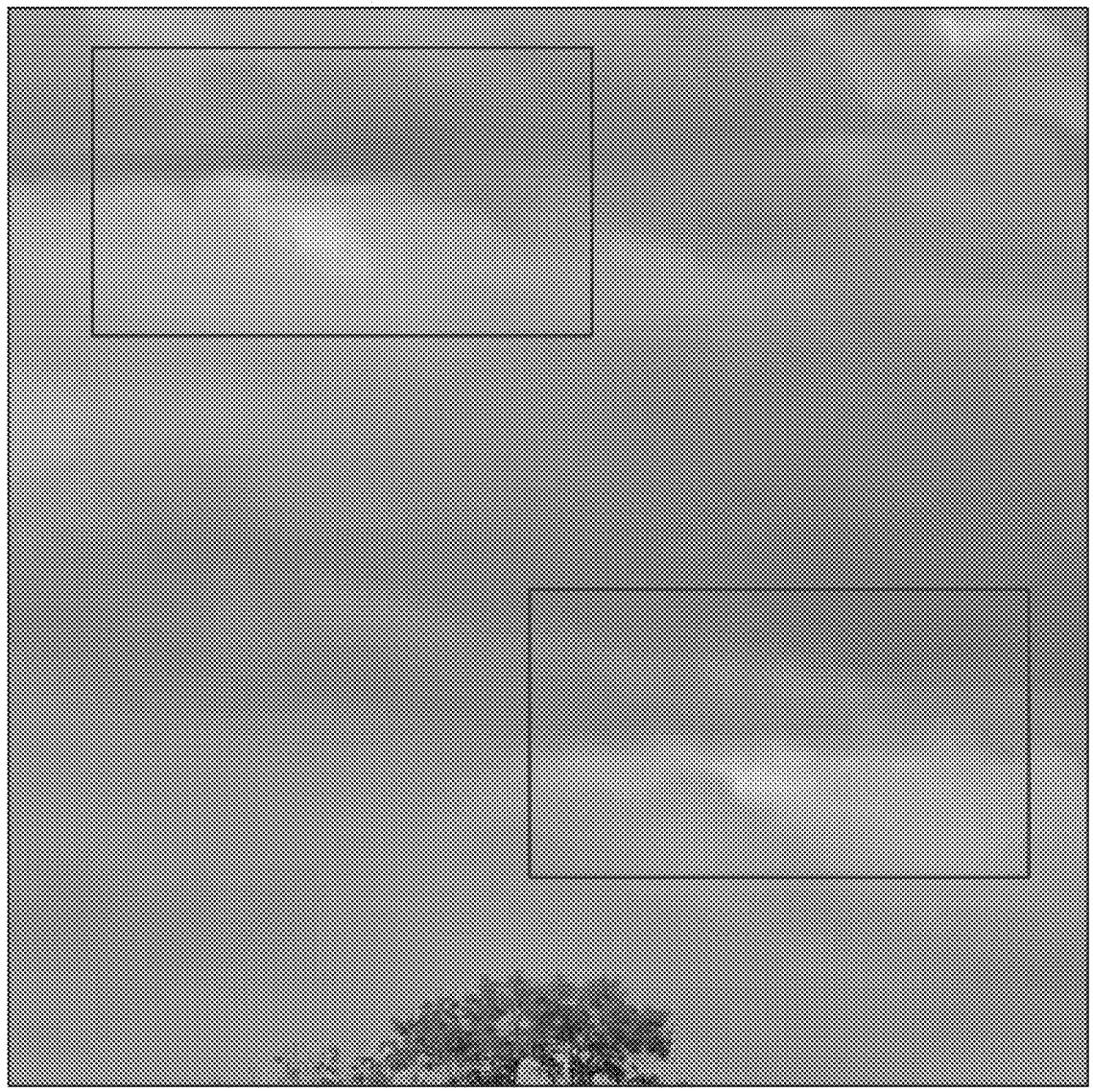
Figure 6A:
Figure 6A:
Figure 6A:
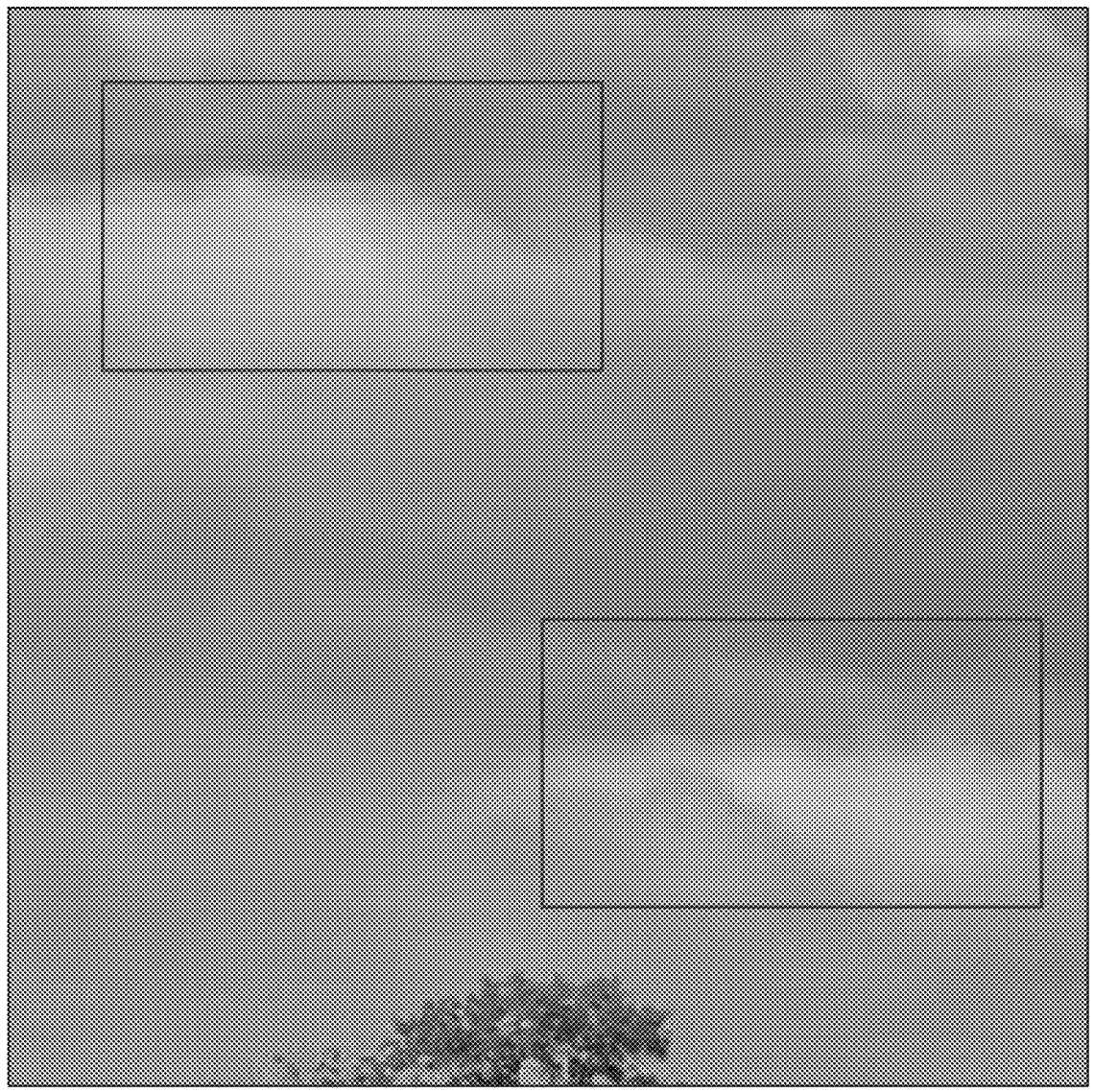
Figure 6A:
Figure 6A:
Figure 6B:
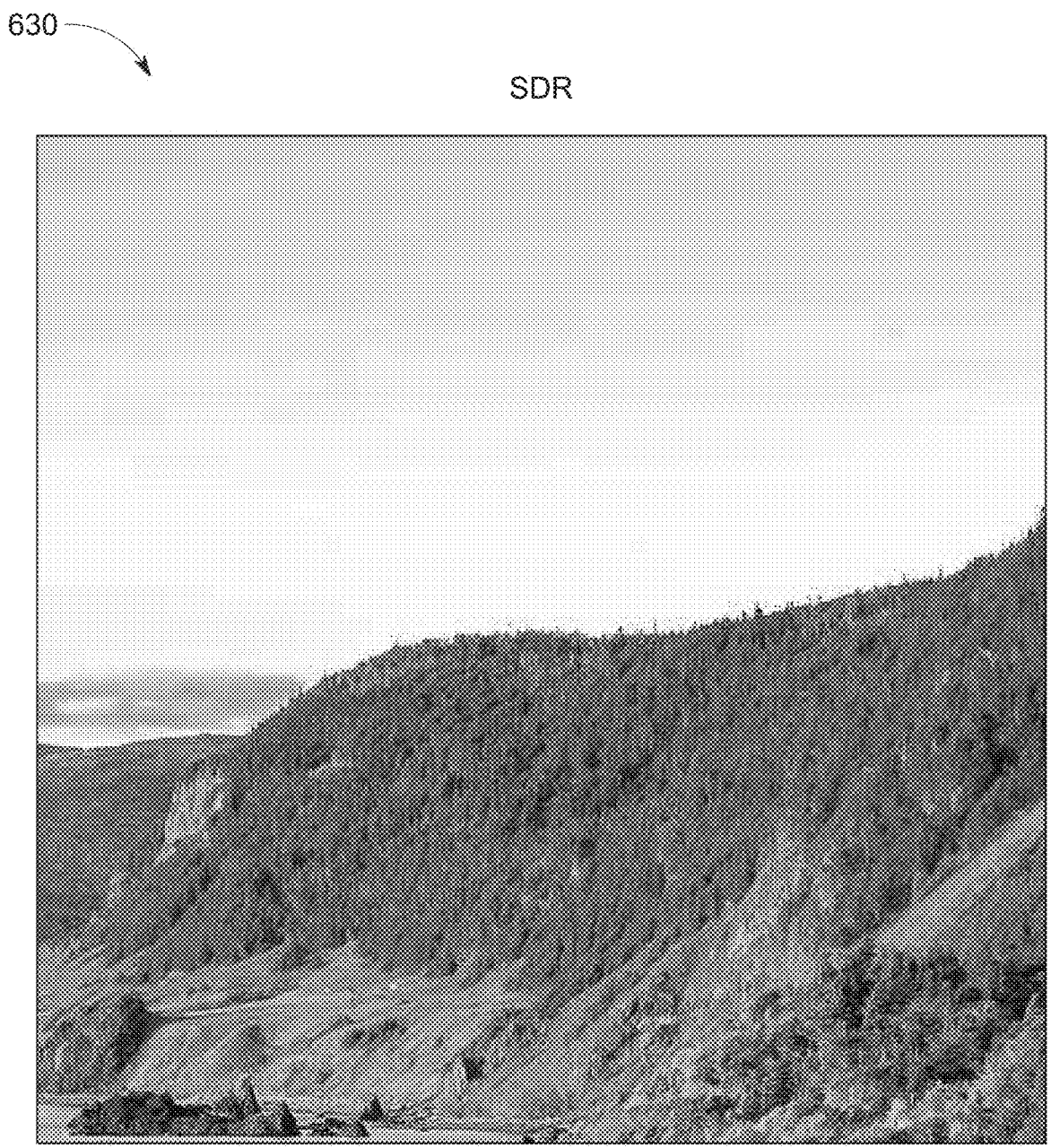
Figure 6B:
Figure 6B:
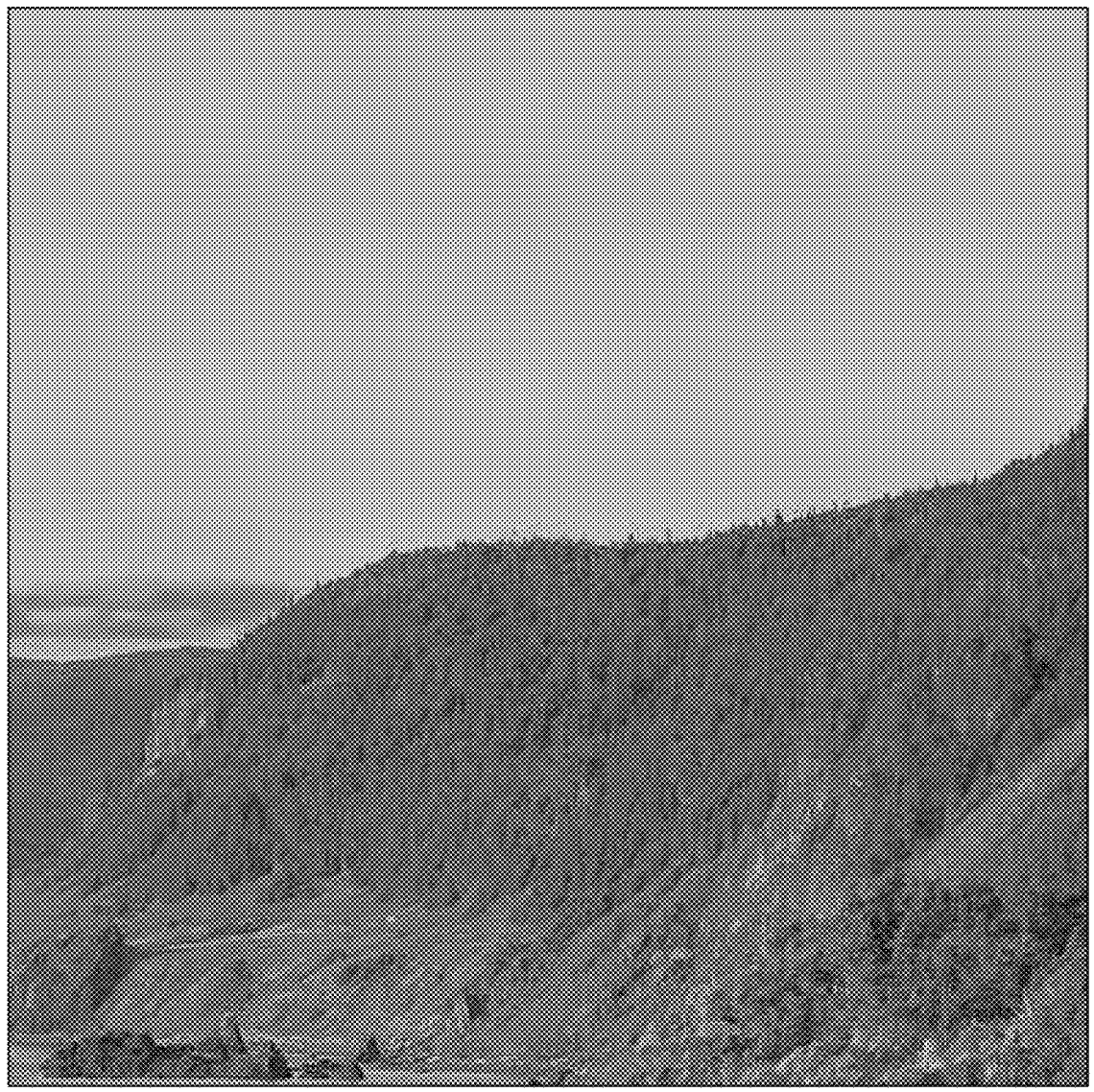
Figure 6B:
Figure 6B:
Figure 6B:
Figure 6B:
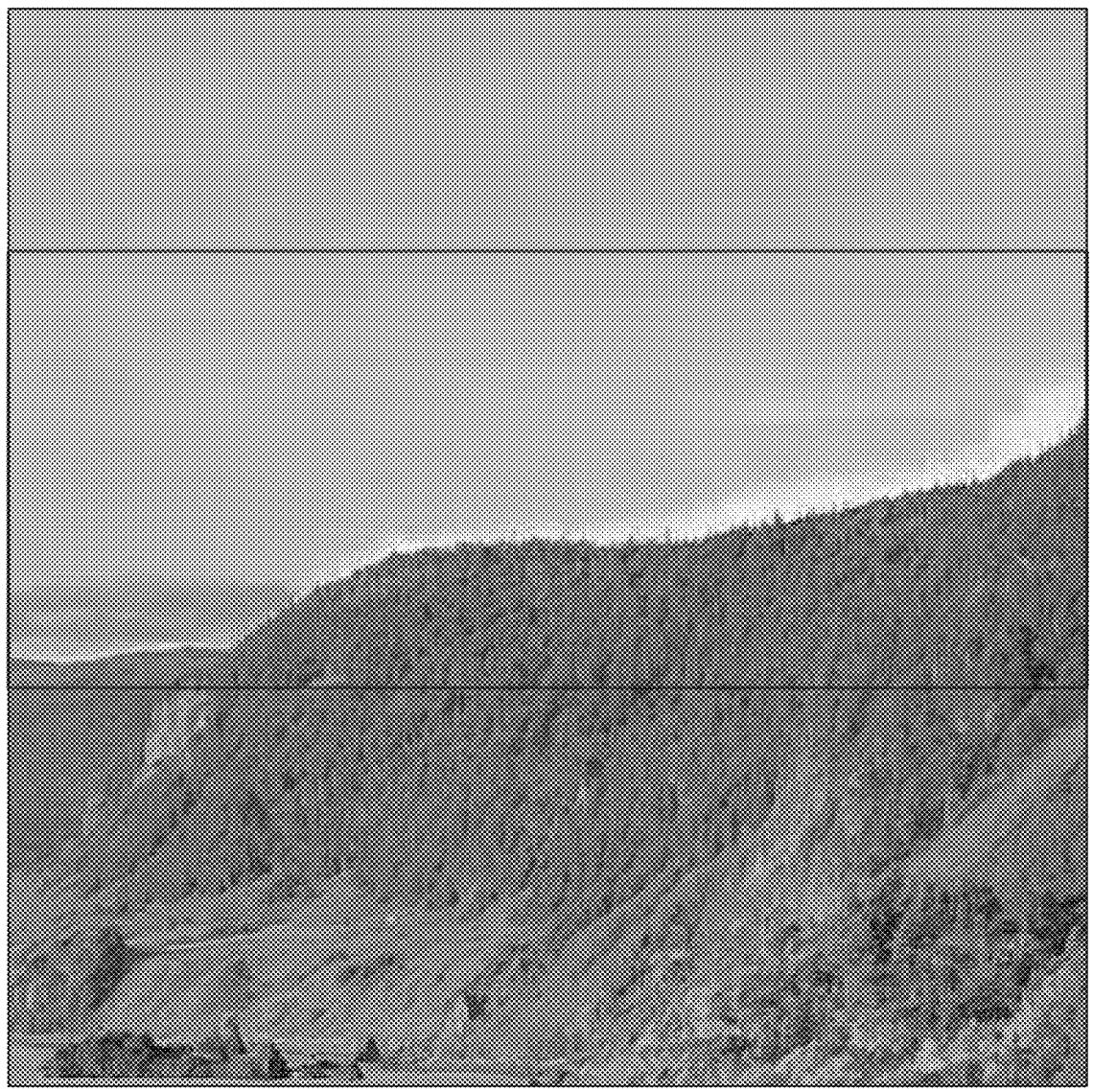
Figure 6B:
Figure 6B:
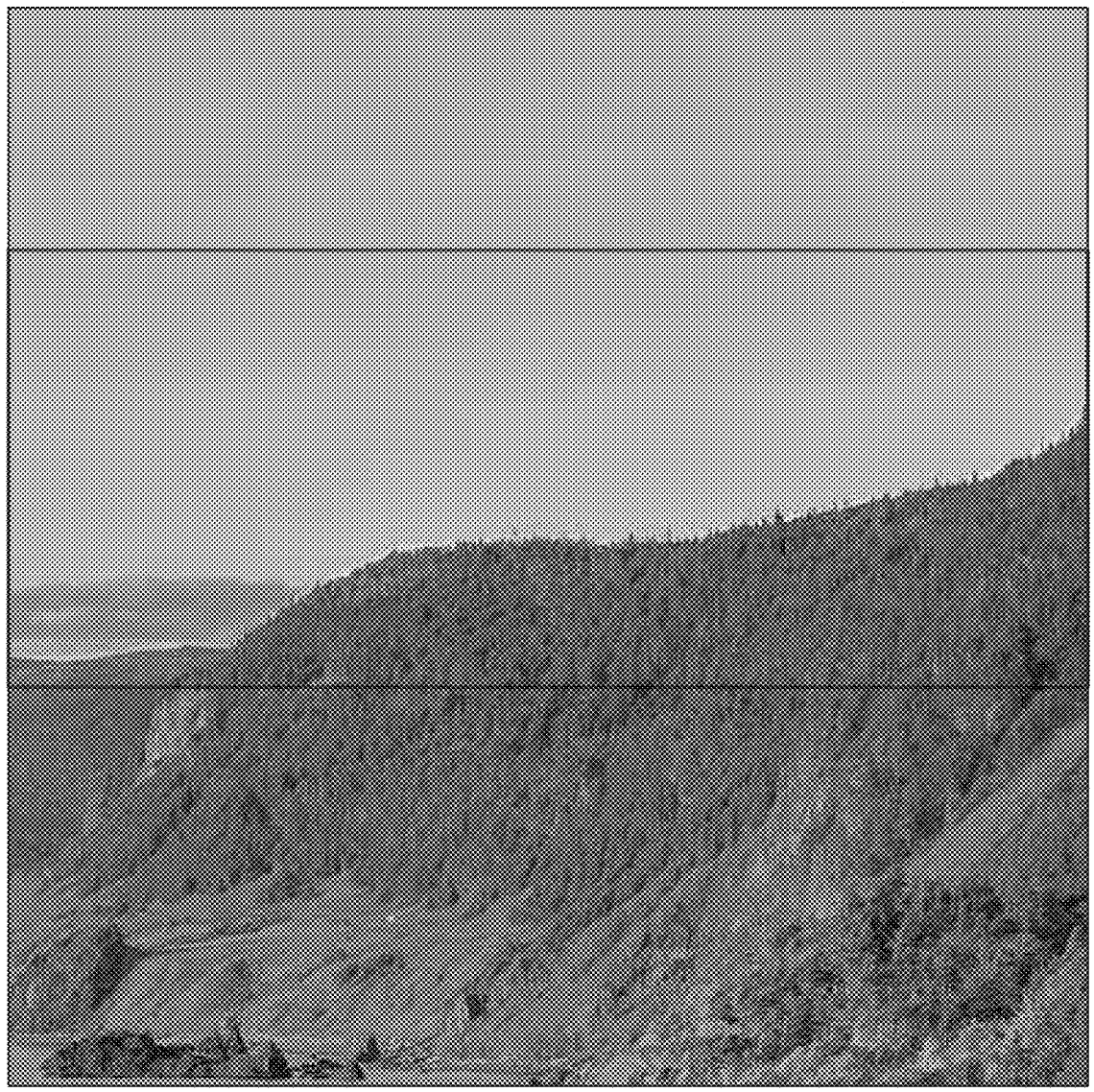
Figure 6B:
Figure 6B:
Figure 6B:
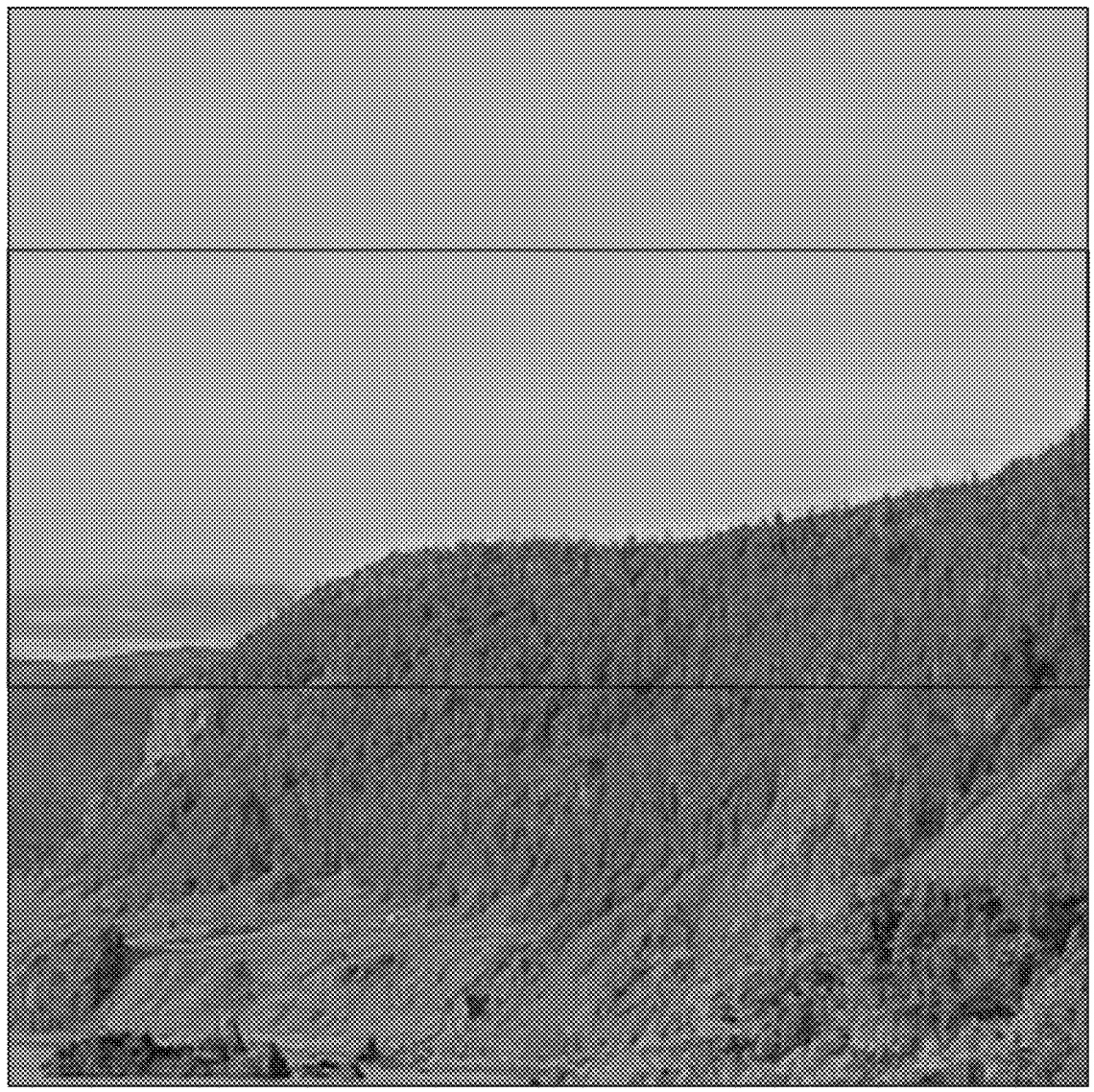
Figure 6B:
Figure 6B:
Figure 6C:
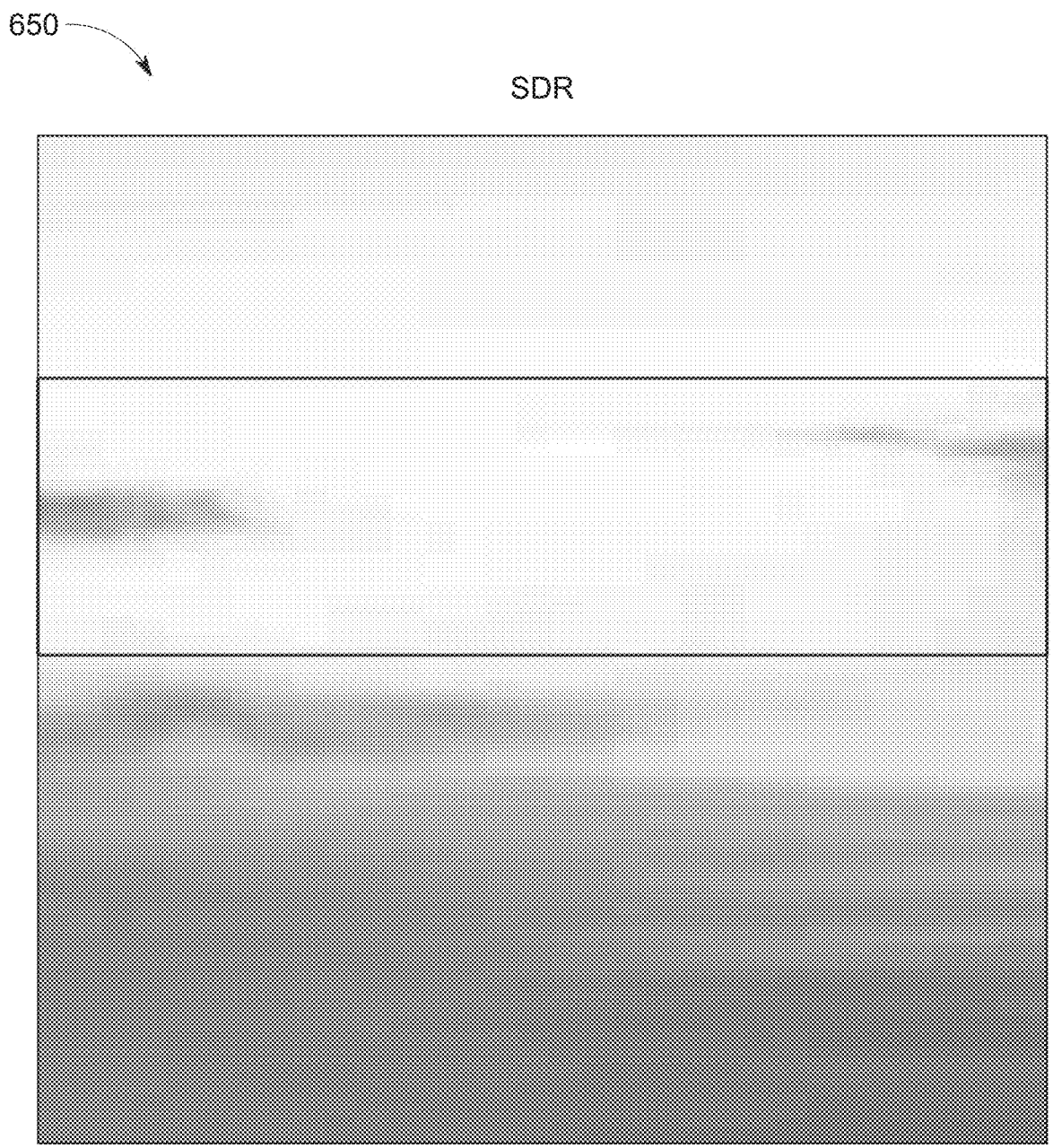
Figure 6C:
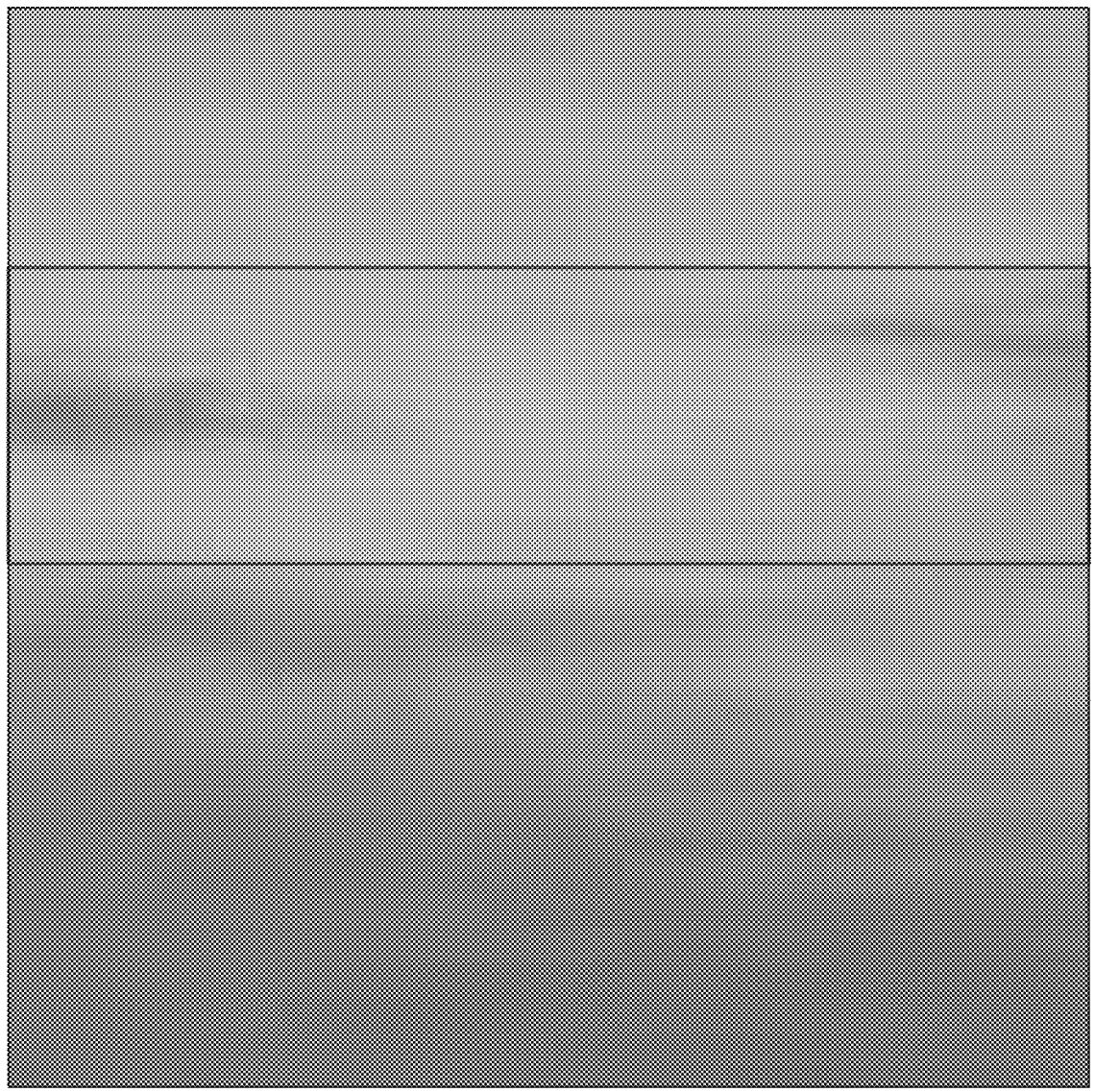
Figure 6C:
Figure 6C:
Figure 6C:
Figure 6C:
Figure 6C:
Figure 6C:
Figure 6C:
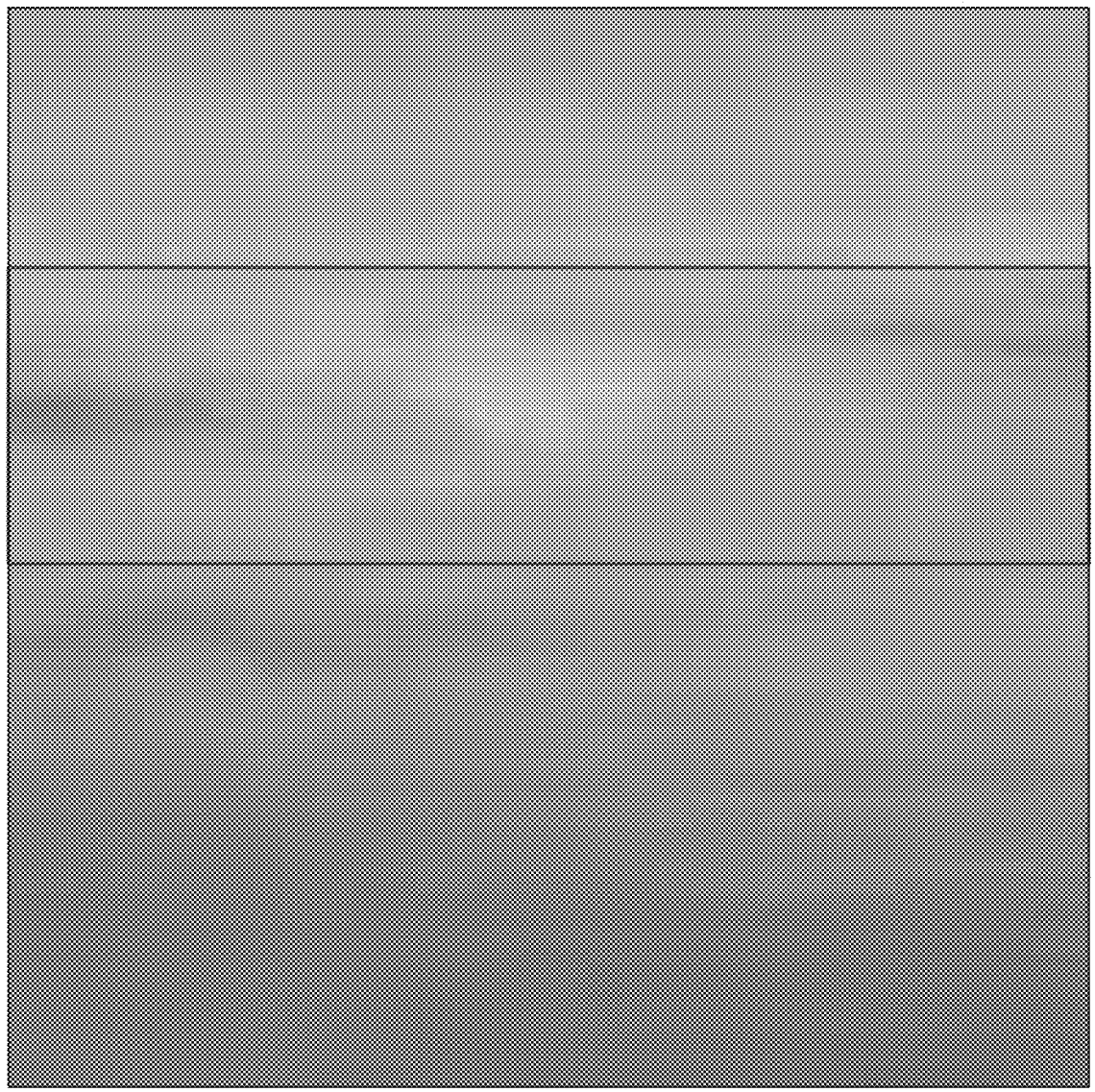
Figure 6C:
Figure 6C:
Figure 6C:
Figure 6C:
Figure 6C:

FIGS. 6A-C illustrate example qualitative comparisons of output images of some embodiments with output images of other techniques. Some technologies produce quantification artifacts as shown by the rectangles in FIGS. 6A-C. One or more embodiments, however, (Efficient-ITM1,2 and Efficient-ITM-SR1,2) removes these quantification artifacts. SDR is the original image, and the other methods shown include those for GT (Ground Truth), Kovaleski (High-quality reverse tone mapping), Masia (Dynamic range expansion based on image statistics), Huo (Physiological inverse tone mapping based on retina response), Hdrenn (HDR image reconstruction from a single exposure using deep CNNs) and singleHDR (Single image HDR reconstruction using a CNN with masked features and perceptual loss) as shown in image groups 610, 630, and 650. Further, Img Correction (Image correction via deep reciprocating HDR transformation), ITM-CNN (Learning the inverse tone mapping from low dynamic range video to high dynamic range displays using convolutional neural networks), Efficient-ITM1, Efficient ITM2, SR-ITM (super resolution ITM), Efficient-ITM-SR1 and Efficient-ITM-SR2 (some embodiments) are shown in image groups 620, 640 and 660. As shown, Efficient-ITM1 and Efficient-ITM2 outperform all the other methods over all the metrics.

Figure 7A:
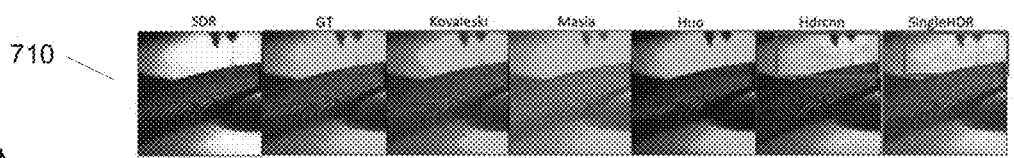
FIGS. 7A-B illustrate further example qualitative comparisons of output images of some embodiments with output images of other techniques.
Figure 7B:
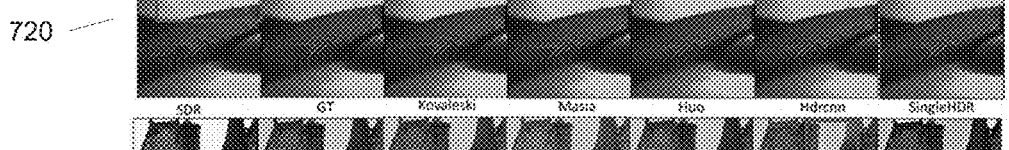
Figure 7B:

FIGS. 7A-B illustrate further example qualitative comparisons of output images of some embodiments with output images of other techniques. Some technologies produce quantification artifacts as shown by the rectangles, however, some embodiments (Efficient-ITM1, Efficient-ITM2 and Efficient-ITM-SR1, Efficient-ITM-SR2) removes these quantification artifacts. SDR is the original image, and the other methods shown include those for GT, Kovaleski, Masia, Huo, Hdrenn and singleHDR as shown in image groups 710 and 730. Further, Img Correction, ITM-CNN, Efficient-ITM1, Efficient ITM2, SR-ITM, Efficient-ITM-SR1 and Efficient-ITM-SR2 (some embodiments) are shown in image groups 720 and 740. As shown, Efficient-ITM1 and Efficient-ITM2 outperform all the other methods over all the metrics.

In some embodiments, in the network, GITM 110 models the complicated global inverse tone using the complicated basis function with coefficients, and it is mainly executed by channel-wise processing. In one or more embodiments, only a few spatial processing operations follows the channel-wise processing to represent a more correct inverse tone. In contrast, many other methods that are based on CNN models process the inverse tone using many convolutional operations, which requires many spatial processing operations.

In one or more embodiments, in the network the smooth regions of an image mainly come from the output of the GITM 110. If there is a very small point, which has similar intensity with a background, for a smooth background the network considers that region as a smooth region. Therefore, the HDR output of this region is mainly generated by the GITM 110 processing. Since the GITM 110 does not have many spatial processing operations, the HDR output keeps the sharpness of the small points while other CNN based methods would smooth out the small points.

As illustrated, FIGS. 7A-B show that one or more embodiments using the NN based methods expand the color gamut as well as restore the tone and details of the HDR image better than other methods. Many DNN methods (e.g., ITM-CNN and SR-ITM) generate quantization artifacts on the smooth region, such as sky portions of an image. Also, these methods do not restore local tone and details of cloud regions well. In contrast, some embodiments (e.g., Efficient-ITM1) do not generate the quantization artifacts on the sky regions and they restore the local tone and details of the clouds more closely to the ground truth image. Thus, the example results show that the Efficient-ITM outperforms all the other methods in terms of quantitative and visual quality. The Efficient-ITM is also extended to Efficient-ITM-SR and it shows results comparable to SR-ITM but uses much less parameters in processing.

Figure 8:
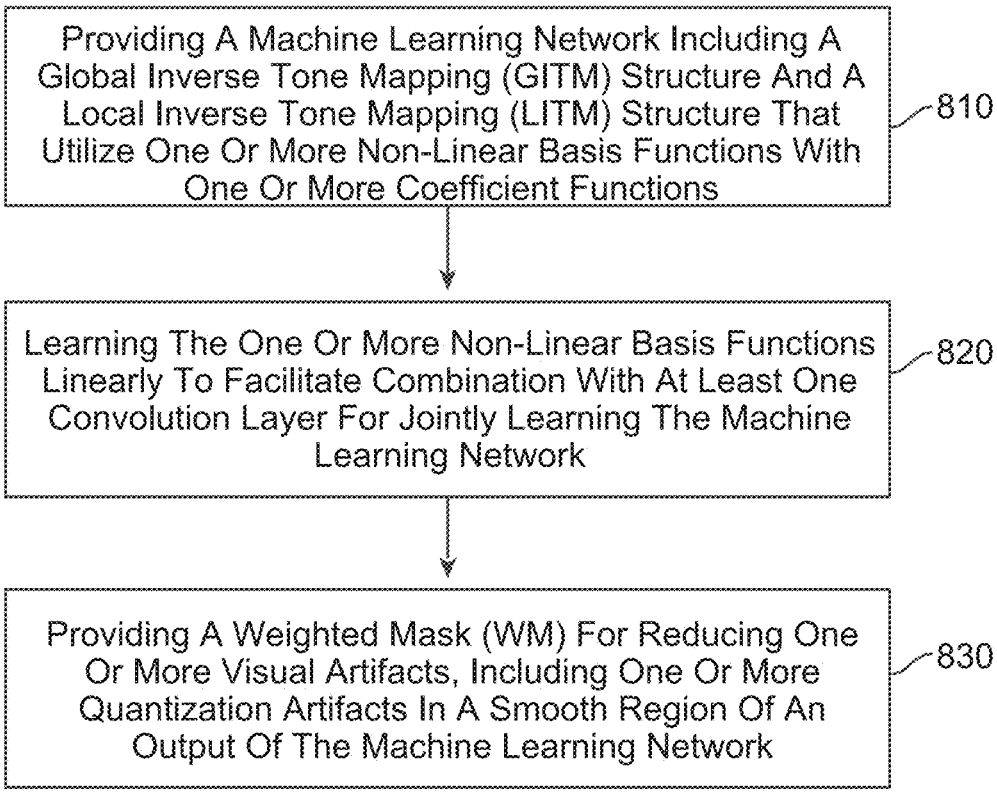
FIG. 8 illustrates a process for efficient NN for ITM for SDR to HDR conversion on HDR displays, according to some embodiments.

FIG. 8 illustrates a process 800 for efficient NN for ITM for SDR to HDR conversion on HDR displays, according to some embodiments. In one or more embodiments, in block 810 process 800 provides a machine learning network including a GITM structure (GITM 110, FIGS. 1, 3) and a LITM structure (LITM 120, FIGS. 1, 4) that utilize one or more non-linear basis functions with one or more coefficient functions (e.g., FIGS. 1, 3 and 4: log( ) 112/122, Splito 113/123, 1×1 convolution 114/124 without bias, concat( ) 115/125, Exp( ) 116/126). In block 820, process 800 further provides learning the one or more non-linear basis functions linearly to facilitate combination with at least one convolution layer for jointly learning the machine learning network.

In block 830, process 800 additionally includes providing a WM (e.g., WM1 131, WM2 132, FIG. 1) for reducing one or more visual artifacts, including one or more quantization artifacts in a smooth region of an output of the machine learning network.

In some embodiments, process 800 further provides that the one or more non-linear basis functions comprise power functions.

In one or more embodiments, process 800 further provides that the machine learning network provides SDR content (e.g., input image 135 ($I_{sdr}$)) to HDR content (e.g., output image 160 ($I_{hdr}$)) conversion.

In some embodiments, process 800 additionally includes providing a DTE function (DTE 140, FIGS. 1, 5) that restores suppressed details in the SDR content (e.g., input image 135 ($I_{sdr}$)).

In one or more embodiments, process 800 further provides that the GITM structure and the LITM structure jointly learn global and local visual features that represent non-linear inverse tone and contrast mapping between SDR and HDR images.

In some embodiments, process 800 additionally provides combining the GITM and LITM structures with one or more convolution layers such that an entire efficient ITM is jointly trained for learning inverse tone, enhanced details and expanded color gamut from SDR content to HDR content.

In one or more embodiments, process 800 further provides the feature that the LITM structure reduces amplification of quantization artifacts in the smooth region using the WM.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method comprising:
   providing a machine learning network including a global inverse tone mapping (GITM) structure and a local inverse tone mapping (LITM) structure that utilize a series of non-linear basis functions with one or more coefficient functions;
   enabling, by the GITM structure and the LITM structure, the series of non-linear basis functions for linear learning to facilitate combination with at least one convolution layer for jointly learning the machine learning network; and
   providing a weighted mask (WM) for reducing one or more visual artifacts, including one or more quantization artifacts in a smooth texture type of region of an output of the machine learning network.

2. The method of claim 1, wherein the series of non-linear basis functions comprise a series of learnable power functions, and the one or more coefficient functions are learnable.

3. The method of claim 1, wherein the machine learning network provides standard dynamic range (SDR) content to high dynamic range (HDR) content conversion, and the machine learning network comprises a deep neural network (DNN).

4. The method of claim 3, further comprising:
   providing a detail enhancement (DTE) function that restores suppressed details in the SDR content.

5. The method of claim 3, wherein the GITM structure and the LITM structure jointly learn global and local visual features that represent non-linear inverse tone and contrast mapping between SDR content and HDR content.

6. The method of claim 5, further comprising:
   combining the GITM and LITM structures with one or more convolution layers such that an entire efficient ITM is jointly trained for learning inverse tone, enhanced details and expanded color gamut from SDR content to HDR content.

7. The method of claim 1, wherein the LITM structure reduces amplification of the one or more quantization artifacts in the smooth texture type of region using the WM.

8. A non-transitory processor-readable medium that includes a program that when executed by a processor performs standard dynamic range (SDR) content to high dynamic range (HDR) content conversion, comprising:
   providing, by the processor, a machine learning network including a global inverse tone mapping (GITM) structure and a local inverse tone mapping (LITM) structure that utilize a series of non-linear basis functions with one or more coefficient functions;
   enabling, by the GITM structure and the LITM structure, the series of non-linear basis functions for linear learning to facilitate combination with at least one convolution layer for jointly learning the machine learning network; and
   providing, by the processor, a weighted mask (WM) for reducing one or more visual artifacts, including one or more quantization artifacts in a smooth texture type of region of an output of the machine learning network.

9. The non-transitory processor-readable medium of claim 8, wherein the series of non-linear basis functions comprise a series of learnable power functions, and the one or more coefficient functions are learnable.

10. The non-transitory processor-readable medium of claim 8, wherein the machine learning network converts the SDR content to the HDR content, and the machine learning network comprises a deep neural network (DNN).

11. The non-transitory processor-readable medium of claim 10, further comprising:
   providing, by the processor, a detail enhancement (DTE) function that restores suppressed details in the SDR content.

12. The non-transitory processor-readable medium of claim 10, wherein the GITM structure and the LITM structure jointly learn global and local visual features that represent non-linear inverse tone and contrast mapping between SDR content and HDR content.

13. The non-transitory processor-readable medium of claim 12, further comprising:
   combining, by the processor, the GITM and LITM structures with one or more convolution layers such that an entire efficient ITM is jointly trained for learning inverse tone, enhanced details and expanded color gamut from the SDR content to the HDR content.

14. The non-transitory processor-readable medium of claim 8, wherein the LITM structure reduces amplification of the one or more quantization artifacts in the smooth texture type of region using the WM.

15. An apparatus comprising:
   a memory storing instructions; and
   at least one processor executes the instructions including a process configured to:
      provide a machine learning network including a global inverse tone mapping (GITM) structure and a local inverse tone mapping (LITM) structure that utilize a series of non-linear basis functions with one or more coefficient functions;
      enable, by the GITM structure and the LITM structure, the series of non-linear basis functions for linearly learning to facilitate combination with at least one convolution layer for jointly learning the machine learning network; and
      provide a weighted mask (WM) for reducing one or more visual artifacts, including one or more quantization artifacts in a smooth texture type of region of an output of the machine learning network.

16. The apparatus of claim 15, wherein the series of non-linear basis functions comprise a series of power functions, the one or more coefficient functions are learnable, the machine learning network provides standard dynamic range (SDR) content to high dynamic range (HDR) content conversion, and the machine learning network comprises a deep neural network (DNN).

17. The apparatus of claim 16, wherein the process is further configured to:
   provide a detail enhancement (DTE) function that restores suppressed details in the SDR content.

18. The apparatus of claim 16, wherein the GITM structure and the LITM structure jointly learn global and local visual features that represent non-linear inverse tone and contrast mapping between SDR content and HDR content.

19. The apparatus of claim 18, wherein the process is further configured to:
   combine the GITM and LITM structures with one or more convolution layers such that an entire efficient ITM is jointly trained for learning inverse tone, enhanced details and expanded color gamut from SDR content to HDR content.

20. The apparatus of claim 15, wherein the LITM structure reduces amplification of the one or more quantization artifacts in the smooth texture type of region using the WM.

\* \* \* \* \*